United States Patent
Peyton et al.

(10) Patent No.: US 10,897,958 B2
(45) Date of Patent: *Jan. 26, 2021

(54) ARTICLE OF FOOTWEAR HAVING AN ELEVATED PLATE SOLE STRUCTURE

(71) Applicant: NIKE, Inc., Beaverton, OR (US)

(72) Inventors: Lee D. Peyton, Tigard, OR (US); DeVonne DeVoe, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/867,885

(22) Filed: Sep. 28, 2015

(65) Prior Publication Data
US 2016/0015123 A1 Jan. 21, 2016

Related U.S. Application Data

(63) Continuation of application No. 13/336,488, filed on Dec. 23, 2011, now Pat. No. 9,179,733.

(51) Int. Cl.
*A43B 5/06* (2006.01)
*A43B 13/18* (2006.01)
(Continued)

(52) U.S. Cl.
CPC .............. *A43B 13/181* (2013.01); *A43B 5/06* (2013.01); *A43B 13/04* (2013.01); *A43B 13/12* (2013.01);
(Continued)

(58) Field of Classification Search
CPC ..... A43B 13/125; A43B 13/18; A43B 13/181; A43B 13/183; A43B 13/185; A43B 13/187
(Continued)

(56) References Cited

U.S. PATENT DOCUMENTS 1,736,609 A 11/1929 Letourneau
2,669,038 A 2/1954 De Werth
(Continued)

FOREIGN PATENT DOCUMENTS

EP 0161653 A1 11/1985
WO WO-0070981 A1 11/2000
(Continued)

OTHER PUBLICATIONS

State Intellectual Property Office, Office Action for CN Application No. 201280070595.7, dated Dec. 31, 2015.
(Continued)

*Primary Examiner* — Sharon M Prange
(74) *Attorney, Agent, or Firm* — Honigman LLP; Matthew H. Szalach; Jonathan P. O'Brien

(57) ABSTRACT

An article of footwear is provided having an elevated plate structure incorporated in the sole structure and optionally including a fluid-filled chamber. The elevated plate structure can include an upper plate and a plurality of legs extending downward toward the outsole. End portions of the legs can engage an upper region of the outsole. The elevated plate structure can form a cage region that can optionally include a fluid-filled chamber substantially disposed therein. The elevated plate structure can further include a lower plate disposed at an upper region of the outsole, which can form a lower portion of the cage region. Portions of the legs can be integrated with impact-attenuating members in the heel region in various configurations and can provide features for the impact-attenuating members, such as support, impact-attenuation and adjustable impact-attenuation features.

16 Claims, 38 Drawing Sheets

(51) Int. Cl.
*A43B 13/04* (2006.01)
*A43B 13/12* (2006.01)
*A43B 13/14* (2006.01)
*A43B 13/20* (2006.01)
*A43B 13/28* (2006.01)
*A43B 13/32* (2006.01)
*B29D 35/12* (2010.01)
*B29D 35/14* (2010.01)

(52) U.S. Cl.
CPC .......... *A43B 13/125* (2013.01); *A43B 13/148* (2013.01); *A43B 13/183* (2013.01); *A43B 13/187* (2013.01); *A43B 13/189* (2013.01); *A43B 13/203* (2013.01); *A43B 13/28* (2013.01); *A43B 13/32* (2013.01); *B29D 35/122* (2013.01); *B29D 35/142* (2013.01); *B29D 35/144* (2013.01)

(58) Field of Classification Search
USPC ........ 36/25 R, 27, 28, 30 R, 30 A, 35 R, 37, 36/38, 92
See application file for complete search history.

(56) References Cited

U.S. PATENT DOCUMENTS

| | | | |
|---|---|---|---|
| 3,834,046 A * | 9/1974 | Fowler | A43B 13/181 36/28 |
| 4,183,156 A | 1/1980 | Rudy | |
| 4,187,620 A * | 2/1980 | Selner | A43B 13/182 36/28 |
| 4,219,945 A | 9/1980 | Rudy | |
| 4,340,626 A | 7/1982 | Rudy | |
| 4,391,048 A * | 7/1983 | Lutz | A43B 1/0036 36/28 |
| 4,936,029 A | 6/1990 | Rudy | |
| 5,042,176 A | 8/1991 | Rudy | |
| 5,191,727 A | 3/1993 | Barry et al. | |
| 5,224,278 A | 7/1993 | Jeon | |
| 5,235,715 A | 8/1993 | Donzis | |
| 5,337,492 A | 8/1994 | Anderie et al. | |
| 5,343,639 A | 9/1994 | Kilgore et al. | |
| 5,513,448 A * | 5/1996 | Lyons | A43B 13/182 36/27 |
| 5,595,003 A * | 1/1997 | Snow | A43B 13/181 36/27 |
| 5,619,809 A * | 4/1997 | Sessa | A43B 7/06 36/28 |
| 5,651,196 A | 7/1997 | Hsieh | |
| 5,713,141 A | 2/1998 | Mitchell et al. | |
| 5,755,001 A | 5/1998 | Potter et al. | |
| 5,952,065 A | 9/1999 | Mitchell et al. | |
| 6,013,340 A | 1/2000 | Bonk et al. | |
| 6,055,747 A | 5/2000 | Lombardino | |
| 6,082,025 A | 7/2000 | Bonk et al. | |
| 6,127,026 A | 10/2000 | Bonk et al. | |
| 6,203,868 B1 | 3/2001 | Bonk et al. | |
| 6,321,465 B1 | 11/2001 | Bonk et al. | |
| 6,354,020 B1 | 3/2002 | Kimball et al. | |
| 6,453,577 B1 | 9/2002 | Litchfield et al. | |
| 6,487,796 B1 | 12/2002 | Avar et al. | |
| 6,568,102 B1 | 5/2003 | Healy et al. | |
| 6,571,490 B2 | 6/2003 | Tawney et al. | |
| 6,662,472 B1 | 12/2003 | Hsu | |
| 6,718,655 B2 * | 4/2004 | Sugawara | A43B 13/141 267/158 |
| 6,751,490 B2 | 6/2004 | Esenaliev et al. | |
| 6,837,951 B2 | 1/2005 | Rapaport | |
| 6,845,573 B2 | 1/2005 | Litchfield et al. | |
| 6,854,198 B2 | 2/2005 | Brooks | |
| 6,898,870 B1 | 5/2005 | Rohde | |
| 6,964,120 B2 | 11/2005 | Cartier et al. | |
| 6,968,636 B2 | 11/2005 | Aveni et al. | |
| 7,082,698 B2 | 8/2006 | Smaldone et al. | |
| 7,086,180 B2 | 8/2006 | Dojan et al. | |
| 7,100,309 B2 | 9/2006 | Smith et al. | |
| 7,131,218 B2 | 11/2006 | Schindler | |
| 7,132,032 B2 | 11/2006 | Tawney et al. | |
| 7,155,844 B2 | 1/2007 | Chu | |
| 7,181,867 B2 | 2/2007 | Litchfield et al. | |
| 7,243,443 B2 | 7/2007 | Swigart | |
| 7,493,708 B2 | 2/2009 | Crowley, Jr. | |
| 7,540,100 B2 | 6/2009 | Pawlus et al. | |
| 7,556,846 B2 | 7/2009 | Dojan et al. | |
| 7,726,042 B2 * | 6/2010 | Meschan | A43B 13/182 36/27 |
| 8,505,220 B2 * | 8/2013 | James | A43B 13/141 36/102 |
| 8,607,475 B2 * | 12/2013 | Nakano | A43B 13/181 36/27 |
| 2002/0189134 A1 | 12/2002 | Dixon | |
| 2003/0051373 A1 | 3/2003 | Goodwin | |
| 2003/0110661 A1 | 6/2003 | Wu | |
| 2005/0132607 A1 | 6/2005 | Dojan et al. | |
| 2005/0167029 A1 | 8/2005 | Rapaport et al. | |
| 2006/0213082 A1 | 9/2006 | Meschan | |
| 2007/0074423 A1 | 4/2007 | Goodwin et al. | |
| 2007/0240331 A1 | 10/2007 | Borel | |
| 2007/0256326 A1 | 11/2007 | Jarvis | |
| 2008/0078101 A1 | 4/2008 | Smith et al. | |
| 2008/0263894 A1 | 10/2008 | Nakano | |
| 2008/0276490 A1 | 11/2008 | Holt et al. | |
| 2008/0313928 A1 | 12/2008 | Adams et al. | |
| 2009/0100705 A1 | 4/2009 | Cook et al. | |
| 2009/0151196 A1 | 6/2009 | Schindler et al. | |
| 2010/0251566 A1 * | 10/2010 | Nakano | A43B 13/181 36/28 |
| 2011/0067264 A1 | 3/2011 | Doyle | |
| 2011/0131831 A1 | 6/2011 | Peyton et al. | |

FOREIGN PATENT DOCUMENTS

| | | |
|---|---|---|
| WO | WO-03043455 A1 | 5/2003 |
| WO | WO-03056964 A1 | 7/2003 |
| WO | WO-2006014046 A1 | 2/2006 |
| WO | WO-2007148910 A1 | 12/2007 |

OTHER PUBLICATIONS

Partial International Search Report for Application No. PCT/US2012/070035, dated Apr. 17, 2013.
International Search Report and Written Opinion for Application No. PCT/US2012/070016, dated Jul. 16, 2013.
Partial International Search Report for Application No. PCT/US2012/070016, dated Apr. 23, 2013.
International Search Report and Written Opinion for PCT/US2008/079074, dated Jun. 4, 2009.
Invitation to Pay Additional Fees and Communication Relating to the Results of the Partial International Search in PCT Application No. PCT/US2008/079074, dated Mar. 10, 2009.
European Patent Office, Extended European Search Report for EP Application No. 15000355.6, dated Sep. 15, 2015.
European Patent Office, Extended European Search Report for EP Application No. 18000273.5, dated Jul. 11, 2018.
European Patent Office, Communication pursuant to Article 94(3) EPC Application No. 18000273.5, dated Apr. 9, 2019.
European Patent Office, Extended European Search Report for EP Application No. 20166564.3, dated May 14, 2020.

* cited by examiner

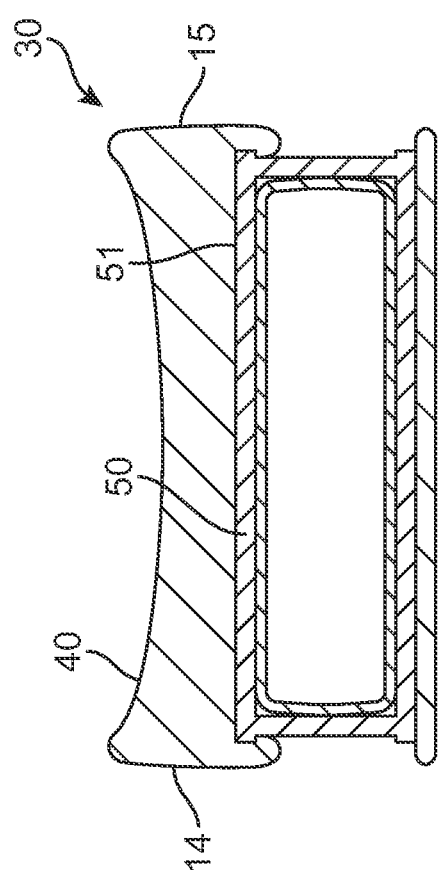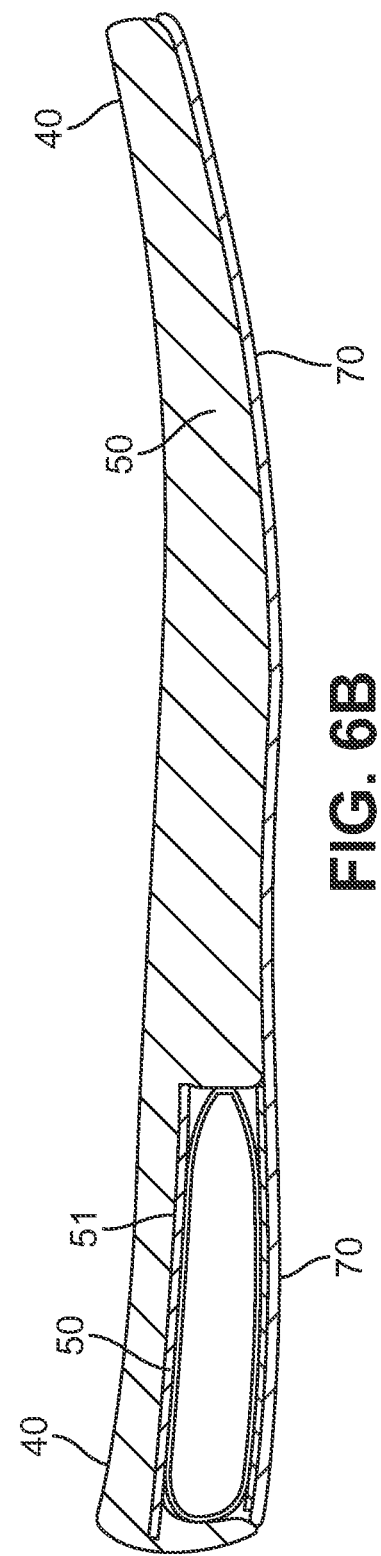

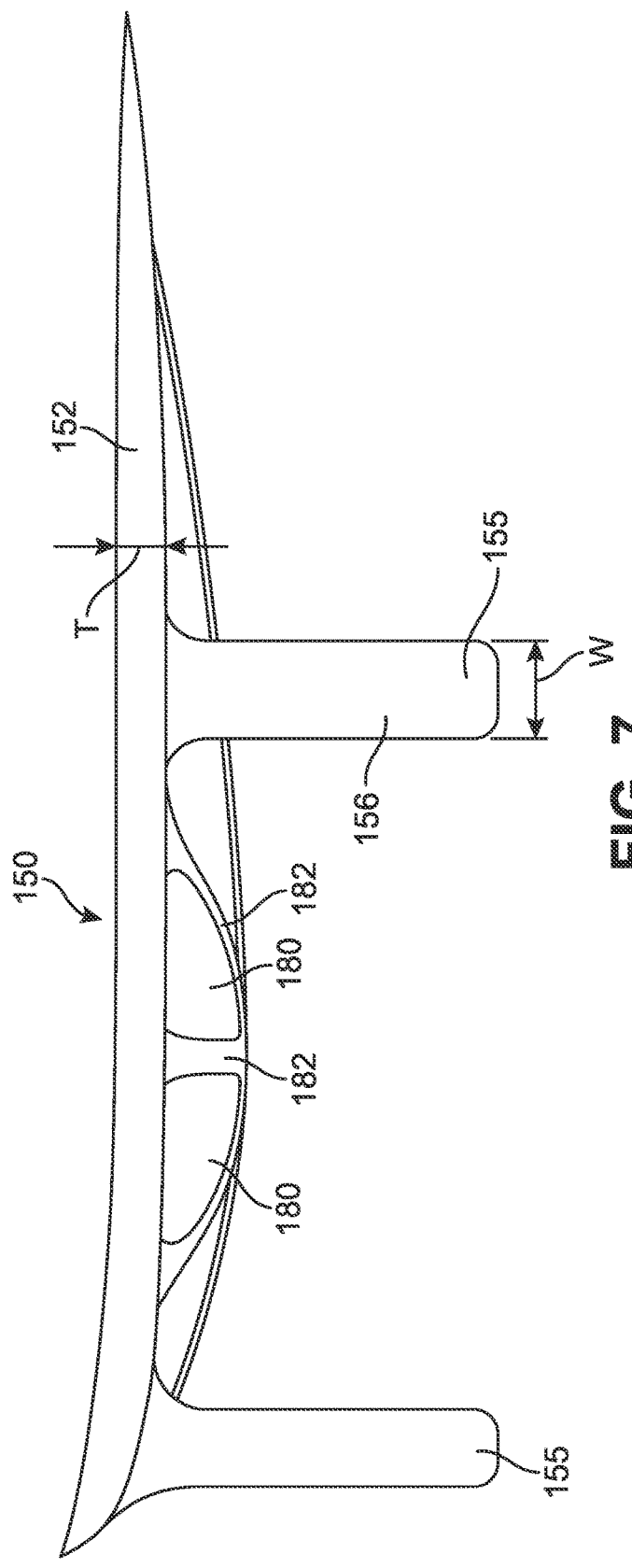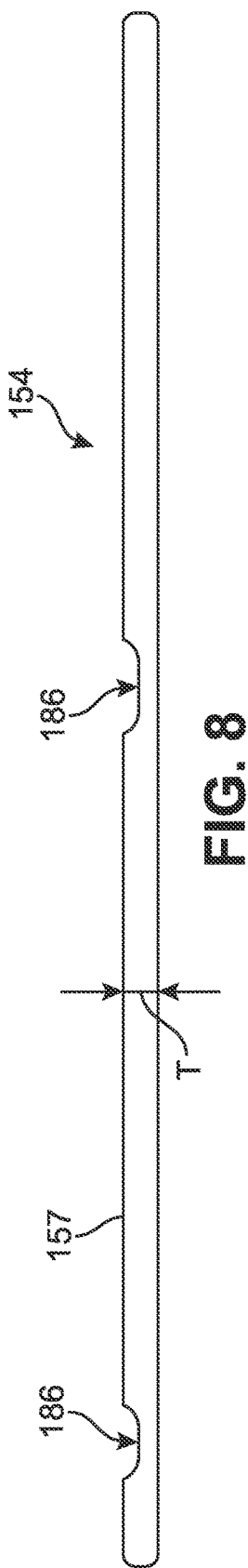

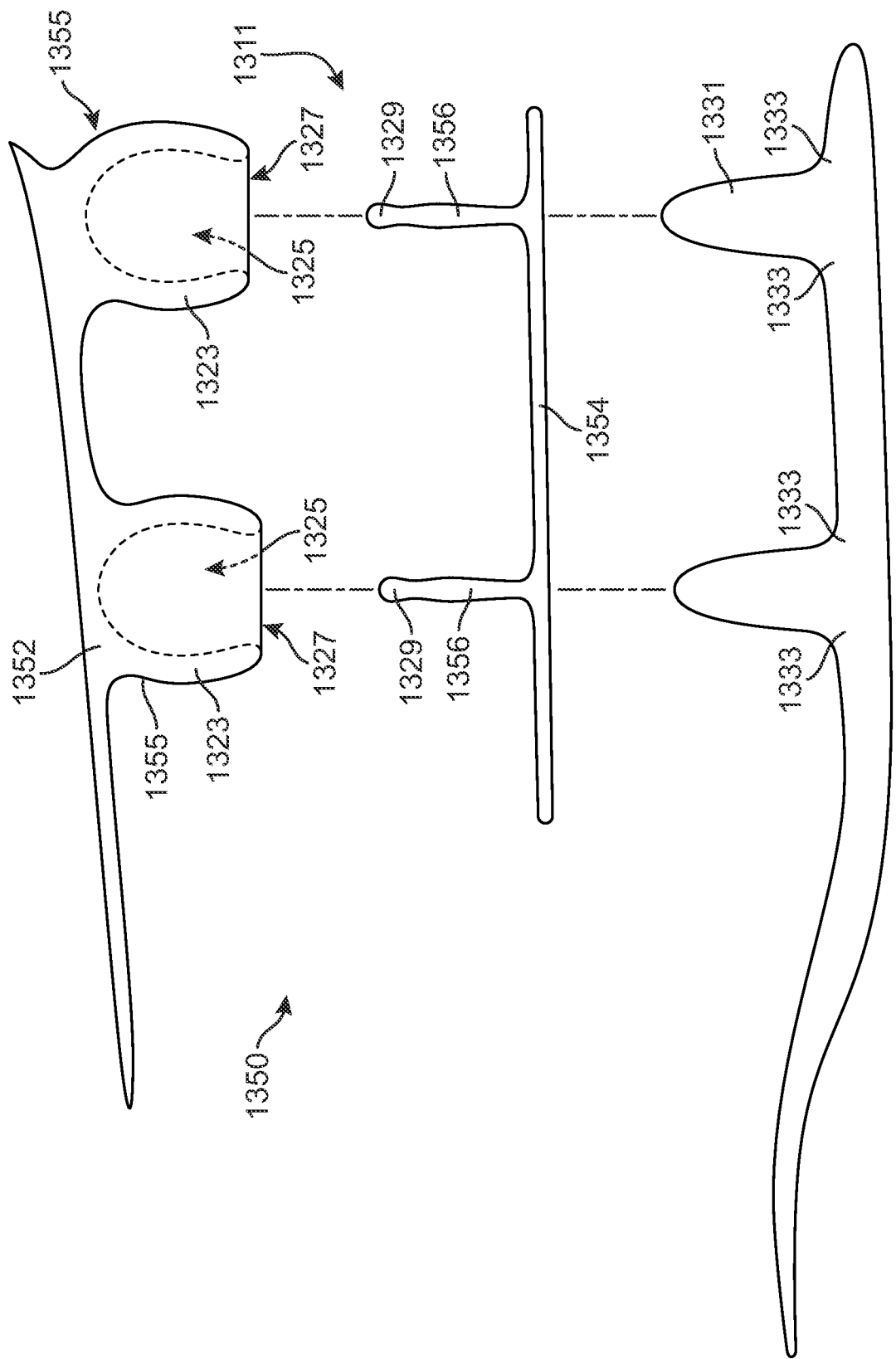

ARTICLE OF FOOTWEAR HAVING AN ELEVATED PLATE SOLE STRUCTURE

CROSS-REFERENCE TO RELATED APPLICATION

This application is a Continuation of U.S. patent application Ser. No. 13/336,488, filed Dec. 23, 2011, the entire contents of which are hereby incorporated by reference.

BACKGROUND

Conventional articles of athletic footwear include two primary elements: an upper and a sole structure. The upper is generally formed from a plurality of elements (e.g., textiles, foam, leather, synthetic leather) that are stitched or adhesively bonded together to form an interior void for securely and comfortably receiving a foot. The sole structure is secured to a lower portion of the upper and is generally positioned between the foot and the ground. In addition to attenuating ground reaction forces (i.e., providing cushioning) during walking, running, and other ambulatory activities, the sole structure can influence foot motions (e.g., by resisting pronation), impart stability, and provide traction, for example. Accordingly, the upper and the sole structure operate cooperatively to provide a comfortable structure that is suited for a wide variety of athletic activities.

The sole structure incorporates multiple layers that are conventionally referred to as a sockliner, a midsole, and an outsole. The sockliner is a thin, compressible member located within the void of the upper and adjacent to a plantar (i.e., lower) surface of the foot to enhance comfort. The midsole is secured to the upper and forms a middle layer of the sole structure that attenuates ground reaction forces during walking, running, or other ambulatory activities. The outsole forms a ground-contacting element of the footwear and is usually fashioned from a durable and wear-resistant rubber material that includes texturing to impart traction.

The primary material forming many conventional midsoles is a polymer foam, such as polyurethane or ethylvinylacetate. In some articles of footwear, the midsole can also incorporate one or more thin plates to reinforce the midsole. In some articles of footwear, the midsole can further incorporate a sealed and fluid-filled chamber that increases durability of the footwear and enhances ground reaction force attenuation of the sole structure. The fluid-filled chamber can be at least partially encapsulated within the polymer foam, as in U.S. Pat. No. 5,755,001 to Potter, et al., U.S. Pat. No. 6,837,951 to Rapaport, and U.S. Pat. No. 7,132,032 to Tawney, et al.

In other footwear configurations, the fluid-filled chamber can substantially replace the polymer foam, as in U.S. Pat. No. 7,086,180 to Dojan, et al. In general, the fluid-filled chambers are formed from an elastomeric polymer material that is sealed and pressurized, but can also be substantially unpressurized. In some configurations, textile or foam tensile members can be located within the chamber or reinforcing structures can be bonded to an exterior surface of the chamber to impart shape to or retain an intended shape of the chamber.

SUMMARY

An article of footwear having an elevated plate structure incorporated in the sole structure can provide various advantageous features, such as increased stability, shock absorption and compression control features. Many of these advantageous features can be enhanced, and additional advantageous features provided, through the optional combination of such an elevated plate structure with a fluid-filled chamber arrangement and/or impact-attenuating elements, such as impact-attenuating elements at the heel region.

In one configuration, an article of footwear has an upper and a sole structure secured to the upper having a midsole, an elevated plate structure substantially embedded within the midsole, and an outsole. The elevated plate structure can include an upper plate and a plurality of legs extending downward toward the outsole. End portions of the legs can engage an upper region of the outsole. The elevated plate structure can form a cage region that can optionally include a fluid-filled chamber substantially disposed within the cage region. In some configurations, a mean thickness of the legs can be greater than a base thickness of the upper plate.

In many configurations, the elevated plate structure can further include a lower plate disposed at an upper region of the outsole, which can form a lower portion of the cage region. The end portions of the legs can engage an upper portion of the lower plate in varying arrangements. In some arrangements, the end portions of the legs can engage the upper portion of the lower plate in a sliding arrangement. In some arrangements, the end portions of the legs can engage the upper portion of the lower plate in a fixed arrangement.

In some fixed arrangements between the legs and the lower plate, the end portions of the legs can be received in a plurality of sockets formed in the upper portion of the lower plate. In some fixed arrangements, the end portions of the legs can be bonded to the lower plate. The end portions of the legs can be bonded to the lower plate in various ways including via an adhesive bond and a thermoplastic bond.

In some configurations, the elevated plate structure can include a heel region disposed proximate the location of the user's heel during use, a central portion within the heel region, and a plurality of ribs extending outward from the central portion toward edge portions of the upper plate. In some configurations, the ribs can be formed from raised inverted channels having substantially the same material thickness as regions of the upper plate between the ribs. In other configurations, the ribs can have greater material thicknesses than adjacent non-rib regions of the upper plate.

In some configurations, an article of footwear has an upper and a sole structure secured to the upper having a midsole, a first impact-attenuating member located in a heel portion of the sole structure, an upper plate embedded within the midsole and formed from a non-foamed polymer material, a first leg formed from a non-foamed polymer material extending downward from the upper plate, and an outsole at a bottom portion of the article of footwear. Some configurations can include a plurality of impact-attenuating members located in the heel portion and a plurality of legs formed from the non-foamed polymer material extending downward from the upper plate. Portions of the first leg or plurality of legs can be integrated with the first impact-attenuating member or plurality of impact-attenuating members and can provide various features, such as support, impact-attenuation, variable impact-attenuation, shock-absorption and user-adjustable impact-attenuation.

Advantages and features of novelty characterizing aspects of the invention are pointed out with particularity in the appended claims. To gain an improved understanding of advantages and features of novelty, however, reference can be made to the following descriptive matter and accompanying figures that describe and illustrate various configurations and concepts related to the invention.

BRIEF DESCRIPTION OF THE DRAWINGS

The foregoing Summary and the following Detailed Description will be better understood when read in conjunction with the accompanying figures.

FIGS. 6A and 6B are cross-sectional views of portions of the sole structure of FIG. 3 taken along lines 6A-6A and 6B-6B of FIG. 4.

FIG. 7 is a side view of a configuration of an elevated plate structure that can be used with the article of footwear of FIG. 1.

FIG. 8 is a side view of a lower plate than can be incorporated in the elevated plate structure of FIG. 7.

FIG. 39 is an exploded side view of the elevated plate structure of FIGS. 36-38 shown with a portion of the outsole in the heel region that encapsulates the lower plate of the plate structure.

DETAILED DESCRIPTION

Figure 1:
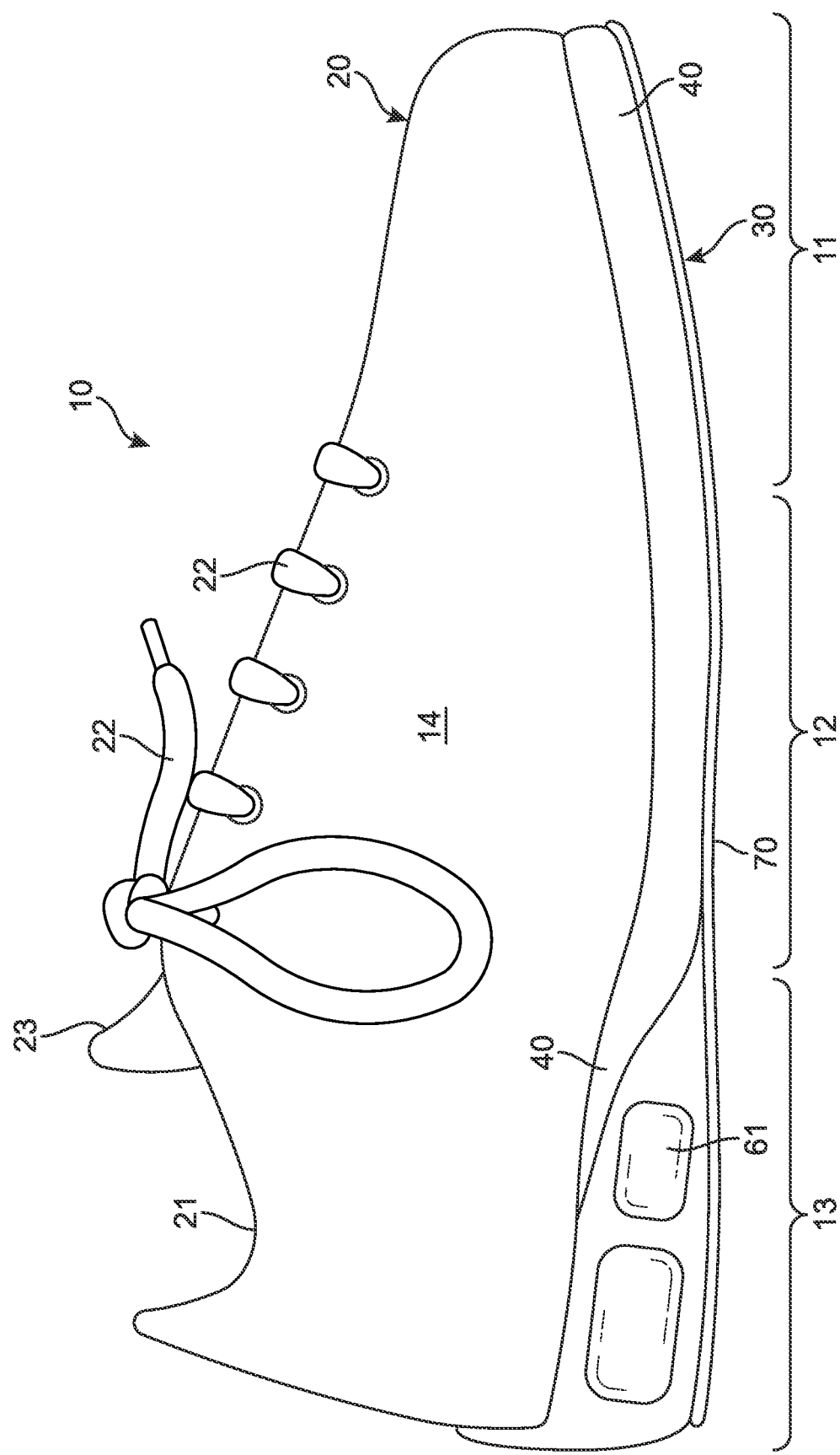
FIG. 1 is a lateral side view of an article of footwear having a sole structure that includes an elevated plate structure in an arrangement with an optional fluid-filled chamber.

The following discussion and accompanying figures disclose configurations of elevated plate structures of articles of footwear that can provide various advantageous features and can be used with or without cooperative arrangements that include fluid-filled chambers and with or without multiple impact-attenuating members in the heel region, such as impact-attenuating members. Concepts related to the elevated plate structures, either alone or in combination with fluid-filled chambers or multiple impact-attenuating members in the heel region, are disclosed with reference to footwear having configurations that are suitable for common uses including walking, running and general athletic activities. The following discussion and accompanying figures disclose an article of footwear having a sole structure that includes, for example, a midsole element, an elevated plate structure, one or more optional fluid-filled chambers, multiple optional impact-attenuating members in the heel region, and an outsole.

The article of footwear is disclosed as having a general configuration suitable for running. Concepts associated with the footwear can also be applied to a variety of other athletic footwear types, including baseball shoes, basketball shoes, cross-training shoes, cycling shoes, football shoes, golf shoes, tennis shoes, soccer shoes, walking shoes, and hiking shoes and boots, for example. The concepts can also be applied to footwear types that are generally considered to be non-athletic, including dress shoes, loafers, sandals, and work boots. Accordingly, the concepts disclosed herein apply to a wide variety of footwear types.

Various features shown in the Figures and noted herein may be referred to using directional adjectives such as top, bottom, right, left, up, down, medial, lateral, etc. These descriptions referring to the orientation of the article of footwear or its features as illustrated in the drawings are for convenience and clarity, and should not be limiting the scope in any way. Generally, however, for convenience and clarity, articles of footwear and their features are described in the orientation typically encountered when worn by a user standing on the ground unless otherwise noted. It is understood that directional adjectives will change if the article of footwear and/or related features are viewed from a different orientation than as pictured or typically worn by the user.

Figure 2:
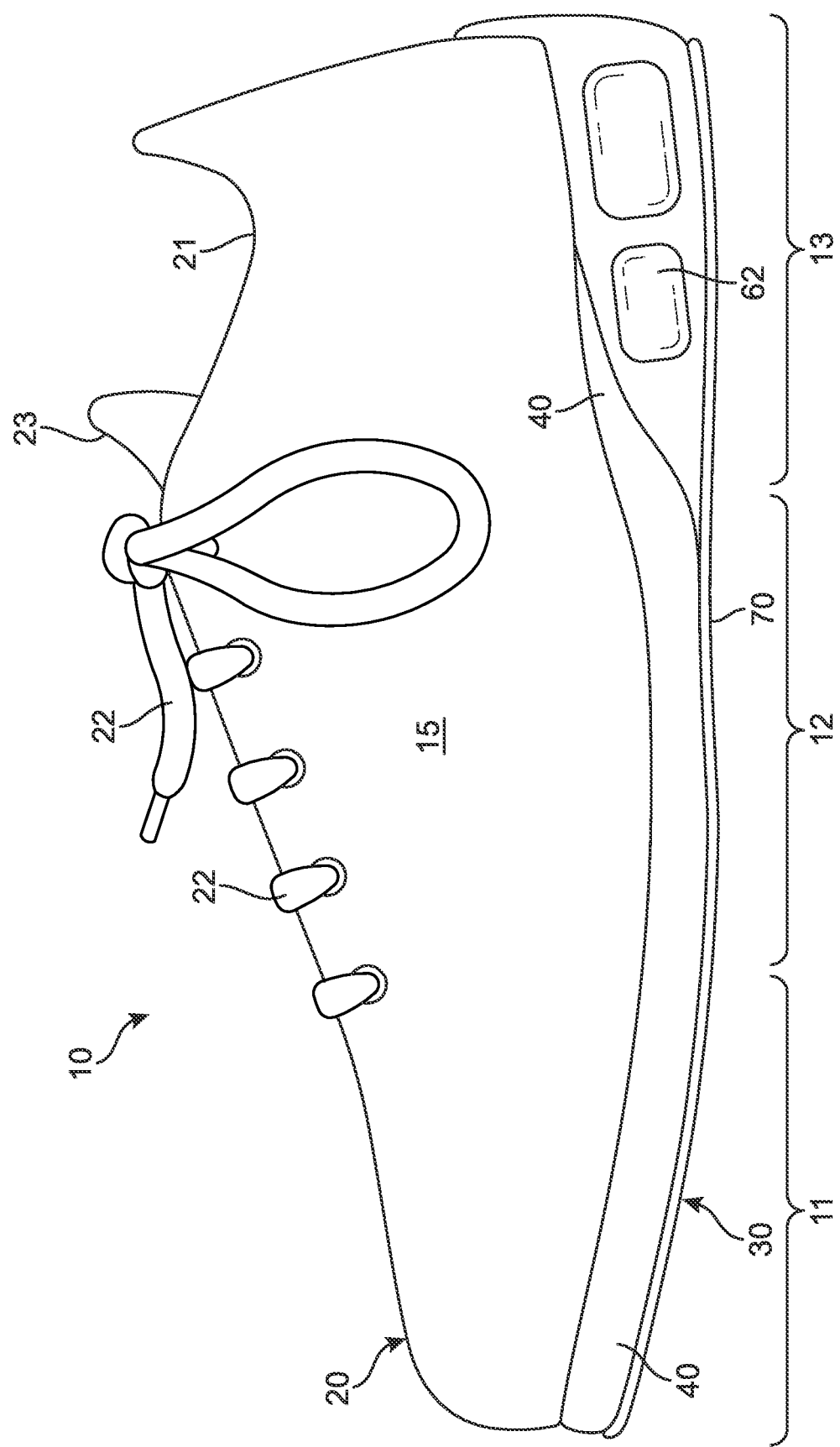
FIG. 2 is medial side view of the article of footwear of FIG. 1.

An article of footwear 10 is depicted in FIGS. 1 and 2 as including an upper 20 and a sole structure 30. For reference purposes, footwear 10 can be divided into three general regions: a forefoot region 11, a midfoot region 12, and a heel region 13. Forefoot region 11 generally includes portions of footwear 10 corresponding with the toes and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which extend through each of regions 11-13 and correspond with opposite sides of footwear 10. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 can also be applied to upper 20, sole structure 30, and individual elements thereof.

Upper 20 is depicted as having a substantially conventional configuration incorporating a plurality of material elements (e.g., textiles, foam, leather, and synthetic leather) that are stitched or adhesively bonded together to form an interior void for securely and comfortably receiving a foot. The material elements can be selected and located with respect to upper 20 in order to selectively impart properties of durability, air-permeability, wear-resistance, flexibility, and comfort, for example. An ankle opening 21 in heel region 13 can provide access to the interior void. In addition, upper 20 can include a lace 22 that is utilized in a conventional manner to modify the dimensions of the interior void, thereby securing the foot within the interior void and facilitating entry and removal of the foot from the interior void. Lace 22 can extend through apertures in upper 20, and a tongue portion 23 of upper 20 can extend between the interior void and lace 22. Given that various aspects of the present discussion primarily relate to sole structure 30, upper 20 can exhibit the general configuration discussed above or the general configuration of practically any other conventional or nonconventional upper. Accordingly, the overall structure of upper 20 can vary significantly.

Sole structure 30 is secured to upper 20 and has a configuration that extends between upper 20 and the ground. In addition to attenuating ground reaction forces (i.e., cushioning the foot), sole structure 30 can provide traction, impart stability, and limit various foot motions, such as pronation. The primary elements of sole structure 30, as depicted in FIGS. 4-6B, are a midsole element 40, an elevated plate structure 50, one or more optional chambers 60, and an outsole 70. Each of these elements will be discussed in greater detail below.

Midsole element 40 is secured to a lower area of upper 20 (e.g., through stitching, adhesive bonding, or thermal bonding) and extends through each of regions 11-13 and between sides 14 and 15. Portions of midsole element 40 are exposed around the periphery of sole structure 30, but can also be covered by other elements, such as material layers from upper 20. Midsole element 40 is primarily formed from a foamed polymer material, such as polyurethane or ethylvinylacetate, which operates to attenuate ground reaction forces as sole structure 30 contacts and is compressed against the ground during walking, running, or other ambulatory activities.

Elevated plate structure 50 of sole structure 30 is at least partially embedded within midsole element 40 and also extends through each of regions 11-13 and between sides 14 and 15. In further configurations of footwear 10, elevated plate structure 50 can be limited to a smaller area of footwear 10. As examples, elevated plate structure 50 can be primarily located in heel region 13, can be only on medial side 15, or can be located to extend under only a portion of the foot. Whereas midsole element 40 can be formed from various foamed polymer materials, elevated plate structure 50 can be formed from various non-foamed polymer materials. That is, elevated plate structure 50 can have a denser and less cellular aspect than midsole element 40. Examples of suitable polymer materials for elevated plate structure 50 include thermoplastic and thermoset polyurethane, polyester, an alloy of polyurethane and acrylonitrile butadiene styrene, nylon, and polyether block amide, for example.

Figure 5:
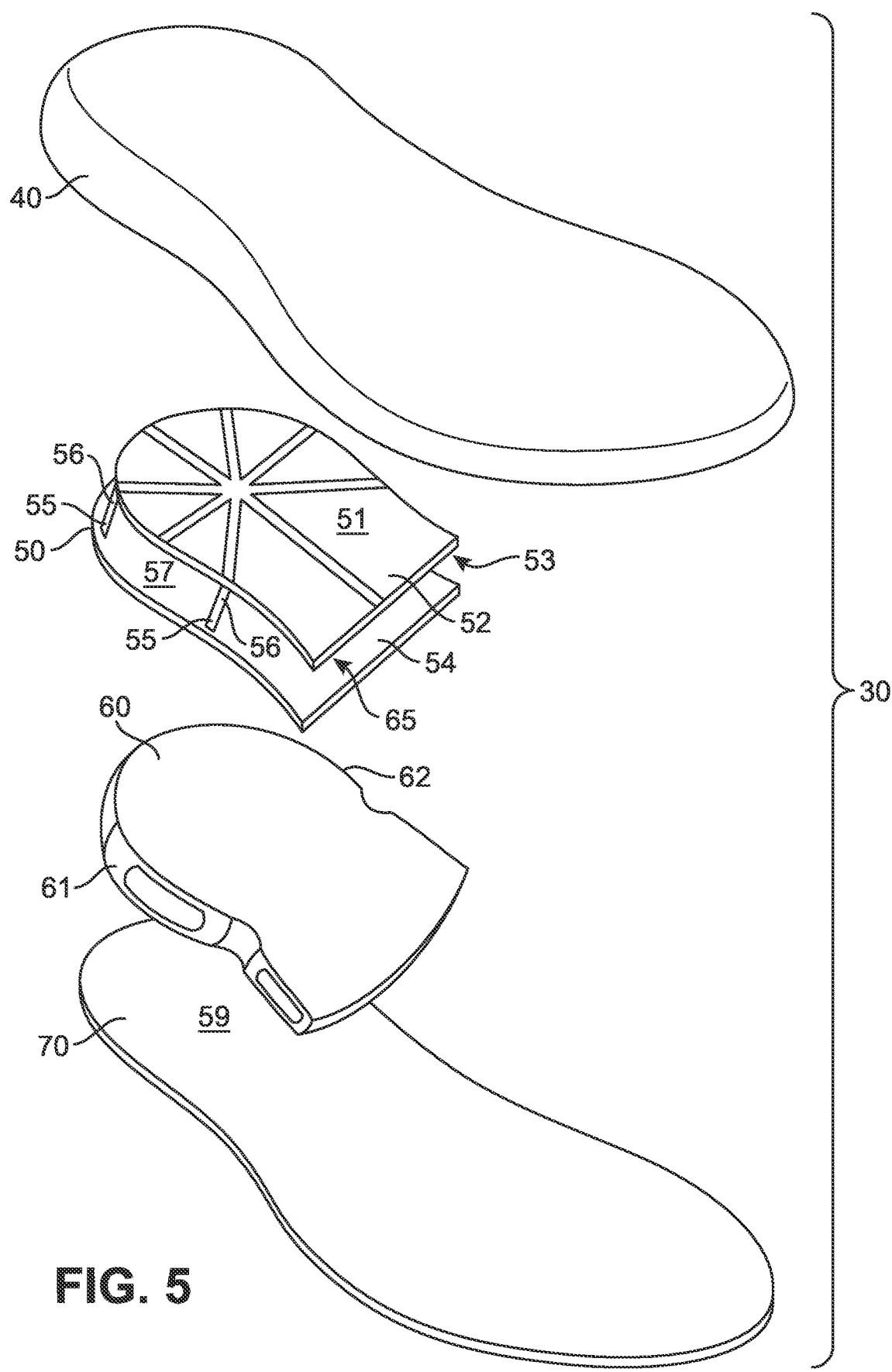
FIG. 5 is an exploded perspective view of the sole structure of FIG. 3.

As shown in FIG. 5, elevated plate structure 50 includes an upper plate 52 having an upper surface 51 and an opposite lower surface 53. Upper surface 51 faces toward upper 20, and lower surface 53 faces away from upper 20 and toward outsole 70. A plurality of legs 56 extend downward from lower surface 53 toward outsole 70 and engage either outsole 70 or an optional lower plate 54. Distal end portions 55 of the legs can engage either outsole 70 at an upper region 59 thereof or optional lower plate 54 at an upper surface 57 thereof. Upper plate 52 and legs 56, along with optional lower plate 54 if included, form an elevated cage 65 in the heel region 13 of sole structure 30, within which foamed polymer material and/or fluid-filled chamber(s) 60 can be located.

When embedded within midsole element 40, upper surface 51 can be substantially covered by the foamed polymer material of midsole element 40 and the remainder of elevated plate structure 50 can be substantially set within the foamed polymer material. That is, a majority of elevated plate structure 50 can be embedded within midsole element 40, but portions of it can be exposed as desired.

Many articles of footwear incorporate plates that impart stiffness to the sole structure. That is, plates in many articles of footwear are relatively stiff and inflexible members that inhibit flex of the sole structure. In contrast, the elevated plate structure 50 facilitates flex while providing structural benefits via its upper plate 52 and optional lower plate 58 having relatively small thicknesses (e.g., the distance between surfaces 51 and 53 of upper plate 52) in comparison with conventional stiff and inflexible members that inhibit flex. In many configurations, upper plate 52 generally has a thickness in a range of 0.5 and 1.5 millimeters or more. When formed from one of the polymer materials discussed above, or another conventional polymer material, a thickness in a range of 0.5 and 1.5 millimeters imparts significant flex to sole structure 30.

Although elevated plate structure 50 may impart significant stiffness to sole structure 30, elevated plate structure 50 also provides various advantages, including moderating or otherwise reducing the perception of chamber(s) 60. That is, elevated plate structure 50, and upper plate 51 in particular, effectively prevents or minimizes the degree to which the lower surface of the foot feels or senses the presence of chamber 60. Additionally, elevated plate structure 50 adds strength to midsole element 40 that inhibits cracking or splitting at high flex points. Accordingly, elevated plate structure 50 has a relatively small thickness that facilitates flex, while moderating the feel of chamber 60 and adding strength to midsole element 40.

Further, the elevated/cage configuration of elevated plate structure 50 can provide substantial structural benefits to sole structure 30 that can be particularly beneficial for movements and impacts in certain directions. Some examples, which are discussed further below, include enhancing the shock-absorbing benefits of the midsole including benefits provided by fluid-filled chambers; providing added support for impacts in particular directions, such as for downward impacts and fore or aft angled impacts; reducing the sensitivity of the fluid-filled chambers to the user; and providing living hinge support to the user's heel during impacts.

Various aspects of upper plate 51 can vary from the relatively planar configuration depicted in the figures. For example, upper plate 51 can be contoured in areas that join with chamber 60, or can be contoured to form a depression in heel region 13. In further configurations, upper plate 51 can also have a plurality of ribs or apertures that vary the properties of sole structure 30. Many of these variations will be discussed in greater detail below.

Figure 3:
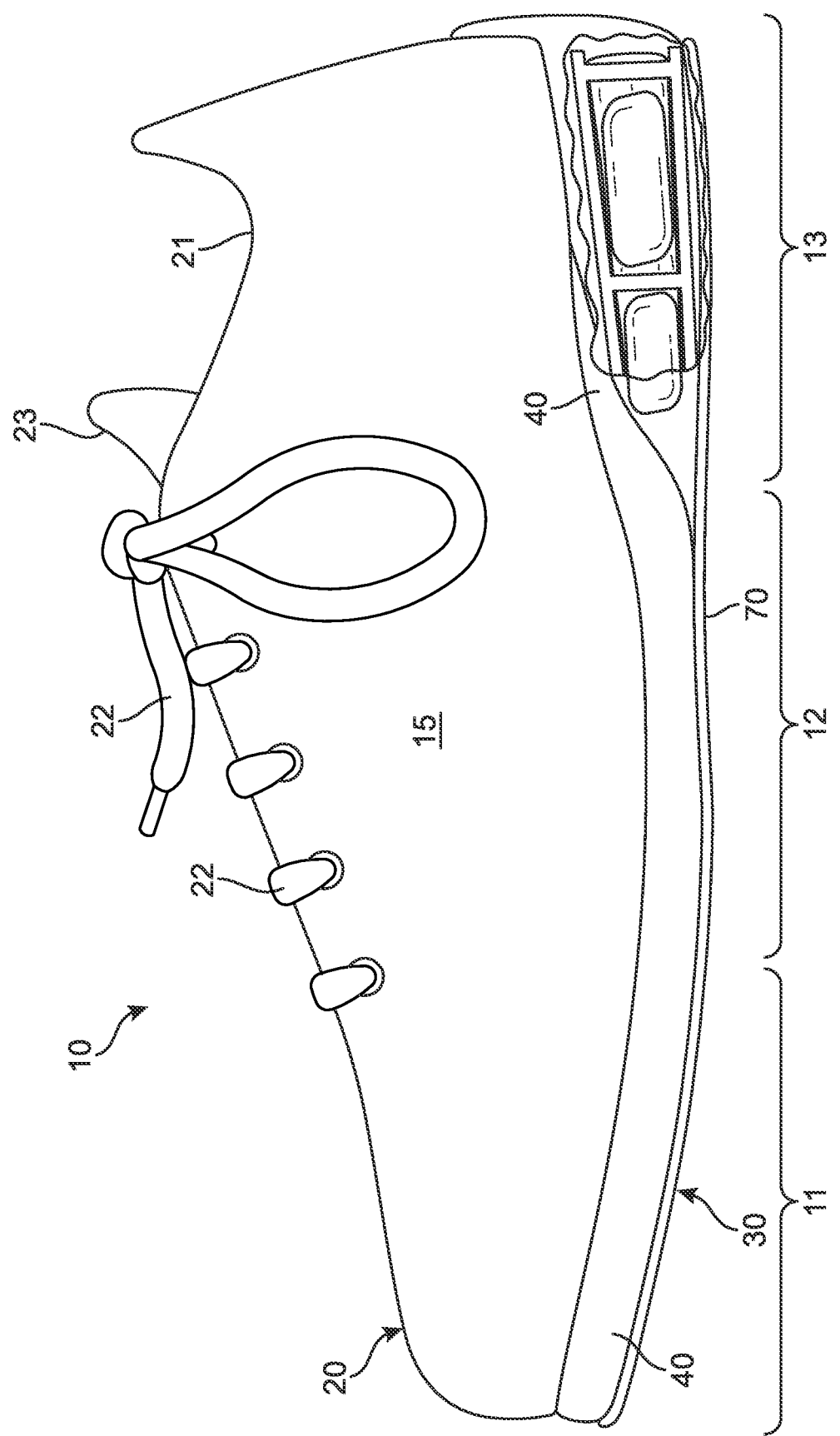
FIG. 3 is medial side view of the article of footwear of FIG. 1 including a cut-away view of a portion of the heel region showing a portion of the elevated plate structure.
Figure 4:
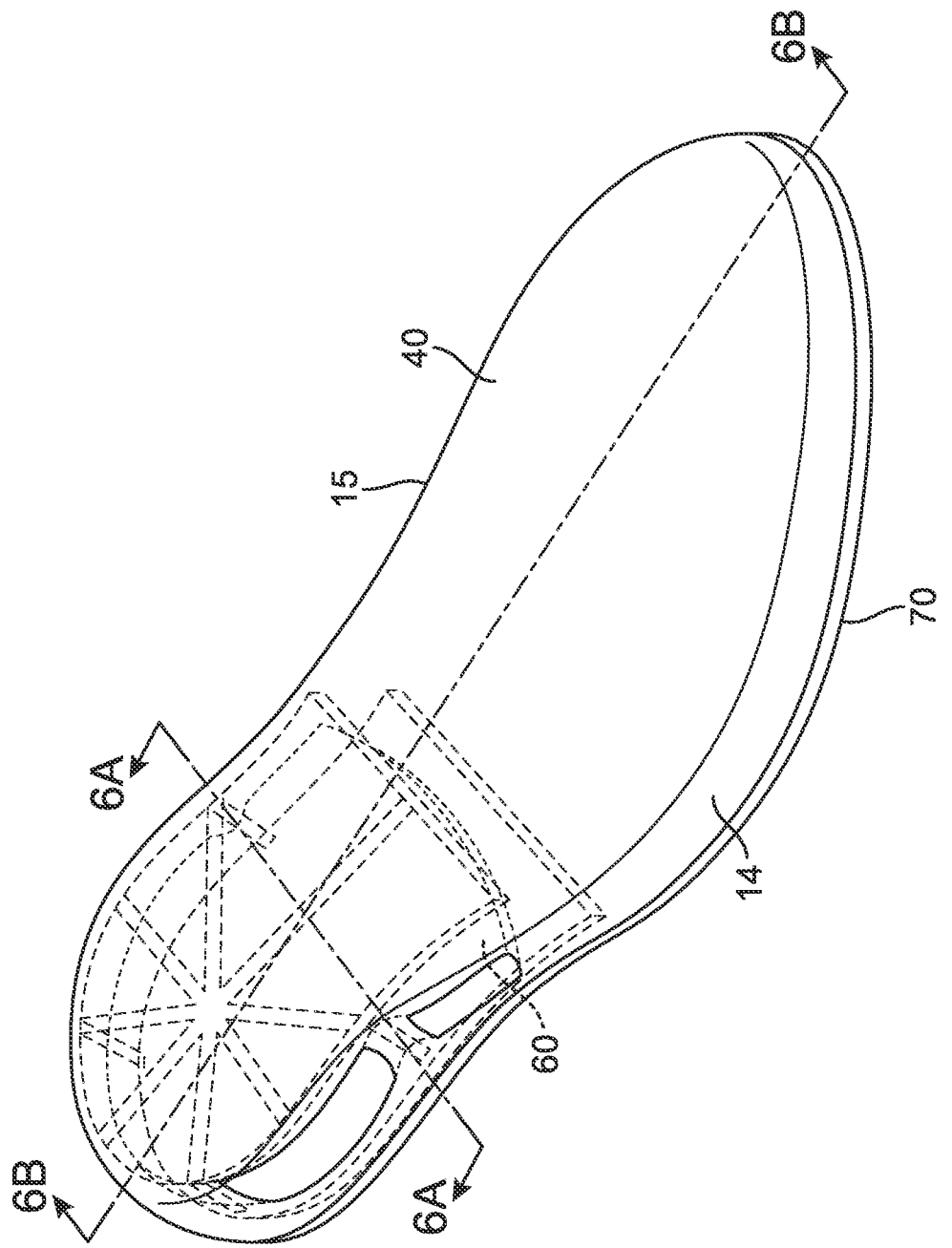
FIG. 4 is a perspective view of the sole structure of the article of footwear of FIG. 1.

Chamber 60 has the general configuration of a bladder formed from a polymer material that encloses a fluid (e.g., gas, liquid, gel). Although the fluid within chamber 60 can be pressurized, the fluid can also be at a substantially ambient pressure. Chamber 60 can be retained within cage 65 adjacent lower surface 53 of upper plate 51 and extend downward from upper plate 51. Further, upper areas of chamber 60 can be secured to upper plate 51 at lower surface 53. Various adhesives, thermal bonding techniques, or mechanical systems can be utilized to secure chamber 60 to upper plate 51. Additionally, side portions 61 and 62 of chamber 60 can be attached to inner regions of legs 56. Lower areas of chamber 60 can be positioned adjacent and secured to outsole 70 and/or a lower plate 58 if present. Further, as shown in FIGS. 1-3, portions of sidewalls 61 and 62 or peripheral surfaces of chamber 60 can be exposed to an exterior of footwear 10 from forefoot region 11 to heel region 13 on both lateral side 14 and medial side 15.

As examples, chamber 60 can incorporate various features or exhibit the general configurations of fluid-filled chambers disclosed in U.S. Pat. No. 7,556,846 to Dojan, et al.; U.S. Pat. No. 7,243,443 to Swigart; U.S. Pat. No. 6,571,490 to Tawney; U.S. Pat. No. 7,131,218 to Schindler; U.S. Patent Application Publication 2008/0276490 to Holt, et al.; and U.S. Patent Application Publication 2009/0151196 to Schindler, et al. A wide range of polymer materials can be utilized for chamber 60. In selecting a material for chamber 60, the ability of the material to prevent the diffusion of the fluid contained by chamber 60 can be considered, as well as the engineering properties of the material (e.g., tensile strength, stretch properties, fatigue characteristics, dynamic modulus, and loss tangent). When formed from a polymer material, chamber 60 can have a thickness of approximately 1.0 millimeter, but the thickness can range from 0.25 to 4.0 millimeters or more, for example, depending upon the specific polymer material utilized. Examples of thermoplastic polymer materials that can be suitable for chamber 60 include urethane, polyurethane, polyester, polyester polyurethane, and polyether polyurethane. Various thermoset polymer materials can also be utilized for chamber 60. More specific examples of materials that can be utilized for chamber 60 include the various materials disclosed in any of (a) U.S. Pat. Nos. 4,183,156, 4,219,945, 4,936,029, and 5,042,176 to Rudy; (b) U.S. Pat. Nos. 5,713,141 and 5,952,065 to Mitchell, et al.; and (c) U.S. Pat. Nos. 6,013,340, 6,082,025, 6,127,026, 6,203,868, and 6,321,465 to Bonk, et al.

The fluid within chamber 60 can be pressurized to a common pressure. In some configurations, chamber 60 can enclose fluids pressurized between zero and three-hundred-fifty kilopascals (i.e., approximately fifty-one pounds per square inch) or more. In addition to air and nitrogen, the fluid contained by chamber 60 can include octafluoropropane or be any of the gasses disclosed in U.S. Pat. No. 4,340,626 to Rudy, such as hexafluoroethane and sulfur hexafluoride, for example. Outsole 70 can be secured to lower surface regions of chamber 60 and can be formed from a textured, durable, and wear-resistant material (e.g., rubber) that forms the ground-contacting portion of footwear 10. Various adhesives, thermal bonding techniques, or mechanical systems can be utilized to secure outsole 70 to chamber 60.

When the foot is located within upper 20, midsole element 40, elevated plate structure 50, chamber 60, and outsole 70 extend under the foot in order to attenuate ground reaction forces, provide traction, impart stability, and limit various foot motions. More particularly, the foamed polymer material of midsole element 40, the legs 56 of elevate plate structure 50 and the fluid-filled aspects of chamber 60 compress, flex or otherwise deform upon the application of forces from the foot to attenuate ground reaction forces. Elevated plate structure 50 imparts various advantages, including moderating or otherwise reducing the perception of chamber 60 if included, as well as providing directional support, stabilizing benefits, and shock absorption according to its geometry. That is, elevated plate structure 50 can effectively prevents or minimizes the degree to which the lower surface of the foot feels or senses the presence of chamber 60, as well as move and flex with the foot, absorb shocks in particular directions, and add strength to midsole element 40. Outsole 70 also has a durable and wear-resistant configuration that imparts traction. Accordingly, the various elements of sole structure 30 operate cooperatively to provide various advantages to footwear 10.

A variety of techniques can be utilized to manufacture sole structure 30. As an example, chamber 60 can be placed within cage 65 and secured to elevated plate structure 50. A mold can be utilized to form midsole element 40 and embed elevated plate structure 50 and chamber 60 within midsole element 40. Outsole 70 can then be secured to midsole element 40 including chamber 60 and elevated plate structure 50.

Referring now to FIGS. 7-10B, additional configurations of an elevated plate structure 150 are shown, which generally include the aspects and preferences discussed above along with potential configurations of elevated plate structure 50. As shown in FIG. 7, elevated plate structure 150 can include an upper plate 152 having a general material thickness T, which in many configurations can be about 0.5 mm to 1.5 mm. In many configurations, legs 156 can generally maintain the same material thickness T as upper plate 152 to provide an elevated plate structure 150 having generally uniform material thickness. Such a configuration having a uniform material thickness around 0.5 mm to 1.5 mm can provide an elevated plate structure 150 that is relatively thin for imparting flexibility to midsole 40 while being able to provide the benefits discussed above according to its geometry and configuration.

In addition, however, the geometry of elevated plate structure 150 can provide directional or otherwise specialized benefits. For example, legs 156 can have a width W that is larger than their material thickness T, such as having a width W that is 2 to 3 times greater than their material thickness T. Such a configuration can provide greater vertical support and impact attenuation for vertical shocks without significantly impacting the lateral flexibility or overall flexibility of the sole structure 30. In other configurations, the material thickness T of legs 156 can be greater than the material thickness of upper plate 152 to provide enhanced support and impact attenuation for vertical shocks without significantly affecting flexibility of the sole structure in other directions, such as flexibility of the sole structure directly below the user's heel or across the width of the sole structure that can be sensed by the user.

As another example configuration, upper plate 152 can be formed as a series of voids 180 between alternating elongate support ribs 182 that together form a support web beneath the user's heel, which can also be cupped to match the curvature of the heel. Such a configuration of elongate ribs 182 radiating outward from a central area of the heel region can provide a highly flexible and contoured support arrangement beneath the user's heel to improve the attenuation of impacts and reduce the sensitivity of shocks sensed by the heel. Further, in addition to enhancing the flex of elevated plate structure 150, voids 180 can improve bonding of the upper plate with the foamed polymer material of midsole element 40. That is, the foamed polymer material can extend through voids 180 to better secure elevated plate structure 150 to midsole element 40.

Referring now to FIG. 8, a lower plate 154 is shown that can be included with elevated plate structure 150 of FIG. 7. As shown, lower plate 154 can have a material thickness T that is generally the same as material thickness T of upper plate 152 to impart flexibility while providing structural and support benefits, but it can also be thicker or thinner than upper plate 152 as desired. Upper surface 157 of lower plate 154 can include sockets 186 formed as recesses on its upper surface for receiving end portions 155 of legs 156. Sockets 186 can enhance the desired structural integrity between the legs 156 and lower plate 154 and improve retention of the legs during use. Sockets 186 can be used with or without additional attachment mechanisms, such as adhesives or other bonding materials, and can facilitate proper fit of the elevate plate structure 150 with sole structure 30 during assembly.

Figure 9:
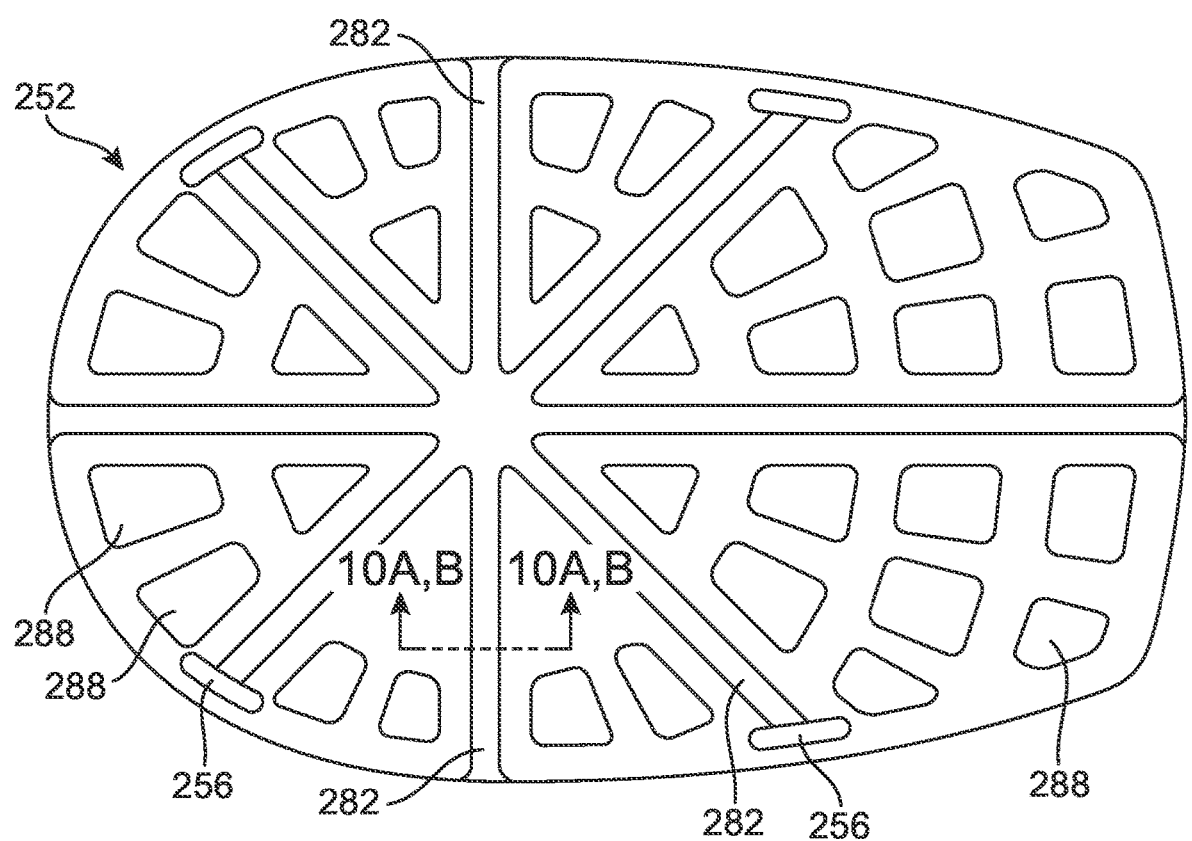
FIG. 9 is a top view of an upper plate according to a configuration of the elevated plate structure of FIG. 7.
Figure 10A:
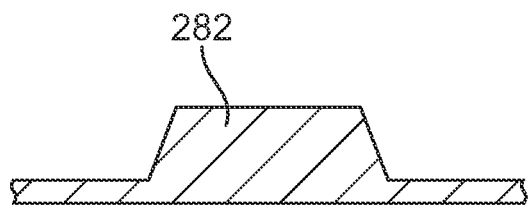
FIGS. 10A and 10B are cross-sectional views of rib configurations for an upper plate of a configuration of an elevated plate structure taken line 10-10 of FIG. 9.
Figure 10B:
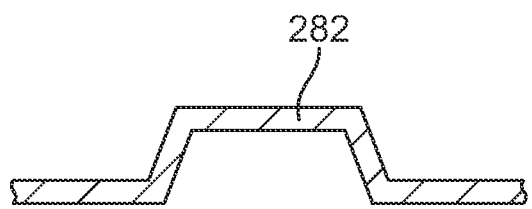

Referring now to FIGS. 9, 10A and 10B, an upper plate 252 is shown as a variation of upper plate 152, which generally includes the aspects and preferences of upper plate 152 except as noted herein. Similar to upper plate 152, upper plate 252 includes a plurality of recesses 288 formed throughout the upper plate and disposed between support ribs 282. Except, however, that recesses 288 are formed as a plurality of smaller recesses disposed throughout a continuous upper plate framework extending between ribs 282, rather than single large voids between ribs 182 as shown in FIG. 7. It is understood for both the configurations of FIGS. 7 and 9 that polymer foam material of midsole 40 can extend through and fill recesses 180 and 288 in upper plates 152 and 252 when embedded in midsole 40 to improve retention of the elevated plate structure within the midsole. The use of a plurality of small recesses 288 in upper plate 252 can enhance flexibility of the upper plate while providing greater strength and integrity to the upper plate than the configuration of large recesses 180 of FIG. 7.

As with the configuration of FIG. 7, ribs 282 can extend from a central region of the upper plate beneath the user's heel outward toward perimeter regions of the upper plate. Further, some of the ribs in both configurations preferably extend to and connect with legs 156 and 256 extending downward from the upper plates. Ribs 282 shown in FIGS. 9, 10A and 10B are formed via raised (or, in the alternative, lowered) portions of upper plate 252. As illustrated in FIG. 10A, the raised rib shape can be provided via greater material thickness that forms the rib. As shown in FIG. 10B, the raised rib shape can also be provided via a raised channel shape that provides the rib shape without increasing material thickness. Of course, it is understood that the ribs shown (and modifications of the same) could be provided as downward oriented ribs rather than raised ribs, and that other rib variations are possible, such as channel cross-section ribs that have greater or less material thickness than the base thickness of the upper plate adjacent the ribs. Regardless of the particular configuration, ribs 282 and variations of the same can provide enhanced directional support based on their geometry and orientation without substantially affecting the overall flexibility of upper plate 252. For example, in the configurations shown, ribs 182 and 282 can provide enhanced support to the user's heel and transmit some of the forces encountered by the heel to the legs 156, 256 of the elevated plate structure 150, 250 without adding significant thickness or rigidity to the sole structure 30.

Figure 11:
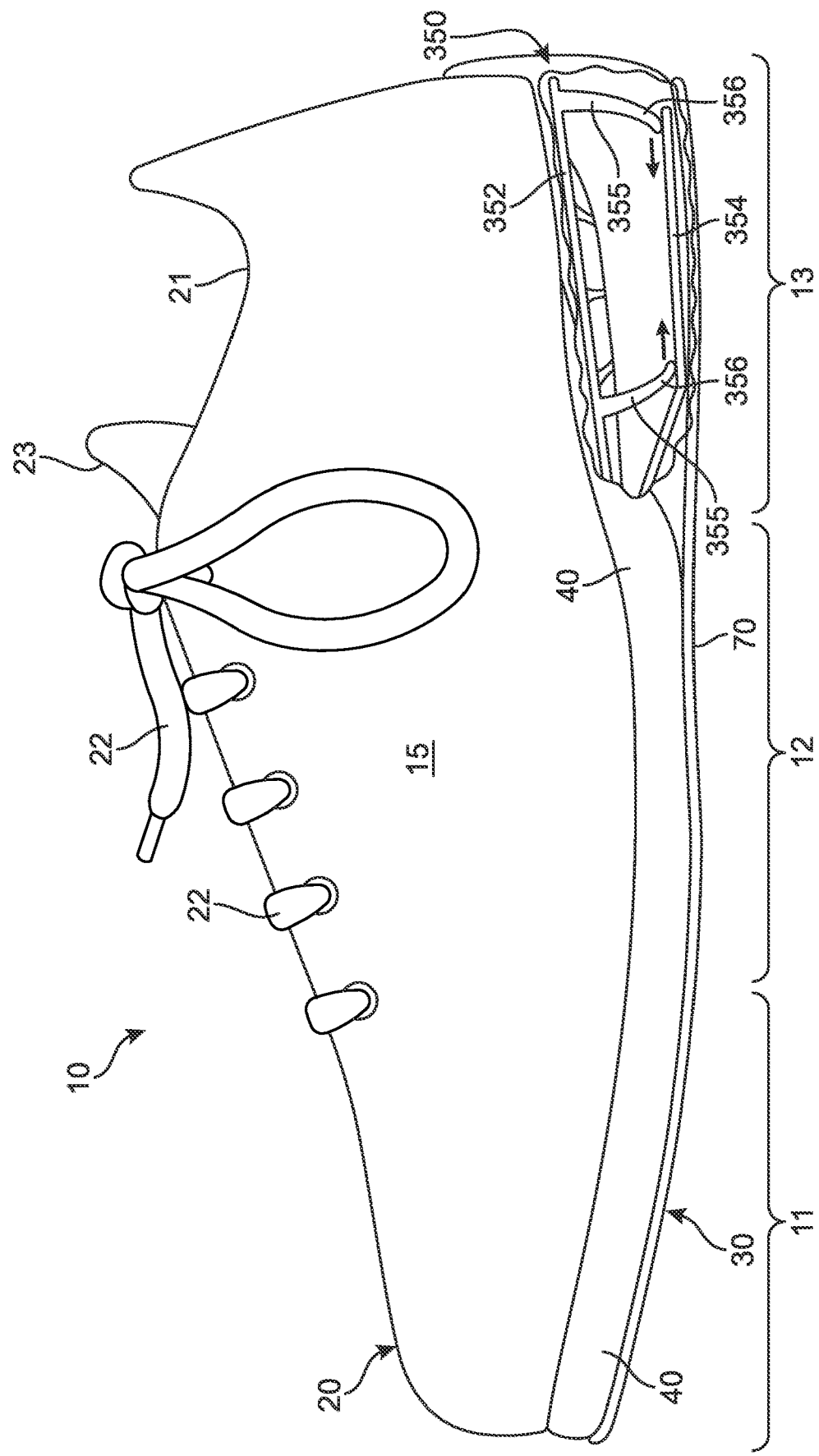
FIG. 11 is a medial side view of an article of footwear including another configuration of an elevated plate structure incorporated within the sole structure and showing a portion of the elevated plate structure via a cut-away view in the heel region.

Referring now to FIG. 11, another configuration of an elevated plate structure 350 is shown as part of article of footwear 10, which includes the aspects and preferences discussed above except as noted herein. Although shown without a fluid-filled chamber, it is understood that one or more fluid-filled chambers could be incorporated with elevated plate structure 350.

In general, elevated plate structure 350 is similar to elevated plate structures 150 and 250, except with respect to legs 355. As shown, legs 355 are slightly curved toward each other, taper down in thickness as they extend from upper plate 352 toward lower plate 354, and engage lower plate 354 in a sliding arrangement. As with other arrangements, legs 355 can act as living hinges via their flexible connection with upper plate 352 and act as springs via their vertical orientation, and thereby absorb forces transmitted between the heel and the outsole.

In addition, however, legs 355 of elevated plate structure 350 can further absorb forces transmitted between the heel and outsole by permitting their leg end portions 356 to slide along lower plate 354 toward each other when attenuating significant downward impacts. As such, legs 355 can flex significantly beyond static bending when needed for absorbing large impacts. In addition, they can also laterally compress portions of midsole 40 during severe impacts to enhance its effectiveness, such as acting to laterally compress portions of a fluid-filled chamber disposed between the legs during large impacts to enhance its shock-absorbing characteristics.

Figure 12:
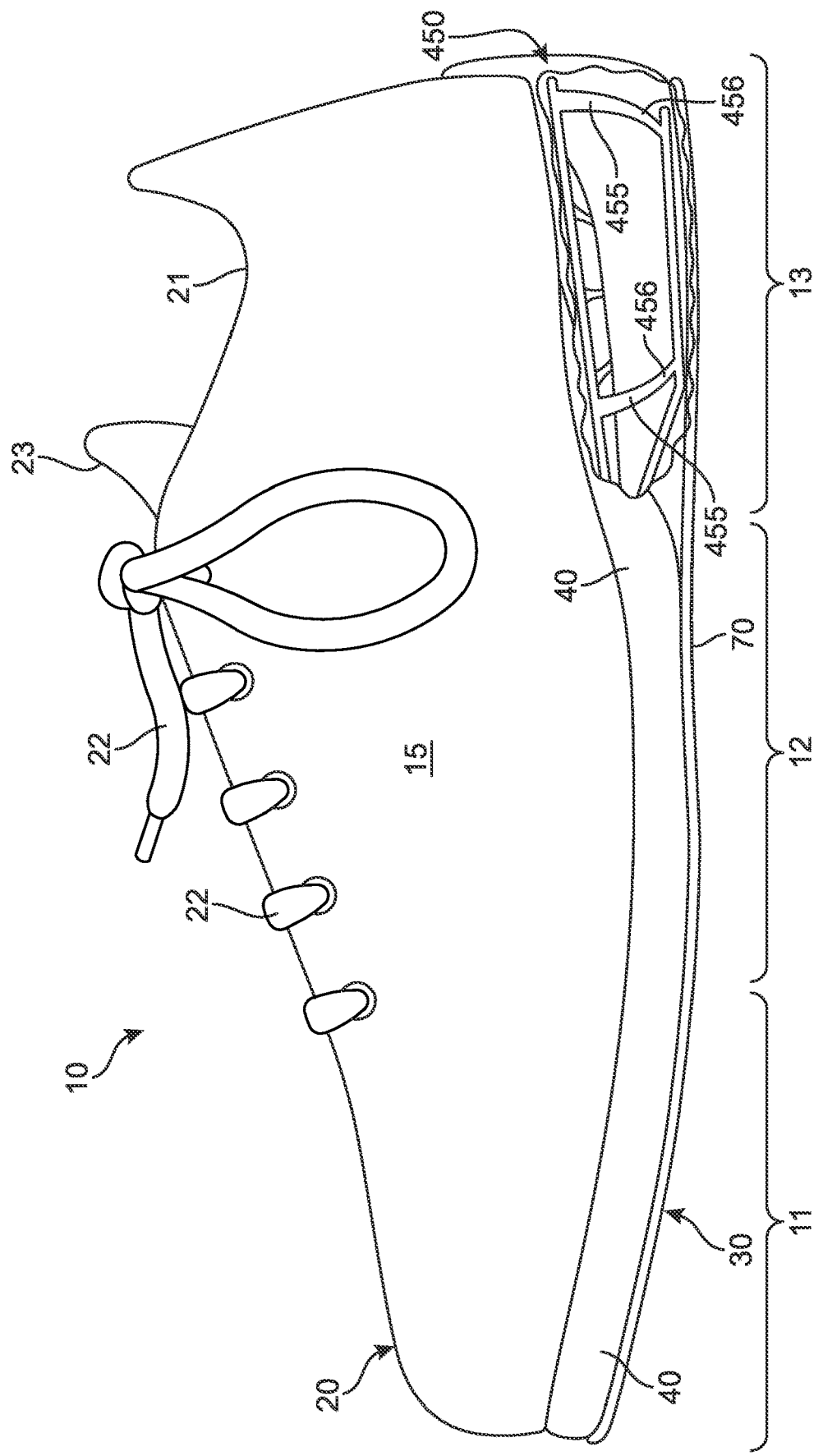
FIG. 12 is a medial side view of an article of footwear including yet another configuration of an elevated plate structure incorporated within the sole structure and showing a portion of the elevated plate structure via a cut-away view in the heel region.

Referring now to FIG. 12, another configuration of an elevated plate structure 450 is shown as part of article of footwear 10, which includes the aspects and preferences discussed above except as noted herein. Elevated plate structure 450 is generally the same as elevated plate structure 350, except that the end portions 456 of legs 455 are retained in a fixed configuration with lower plate 454. As such, legs 455 can significantly attenuate stresses by bending in accordance with their bowed shape without their end portions 456 translating inward during impacts.

Figure 13:
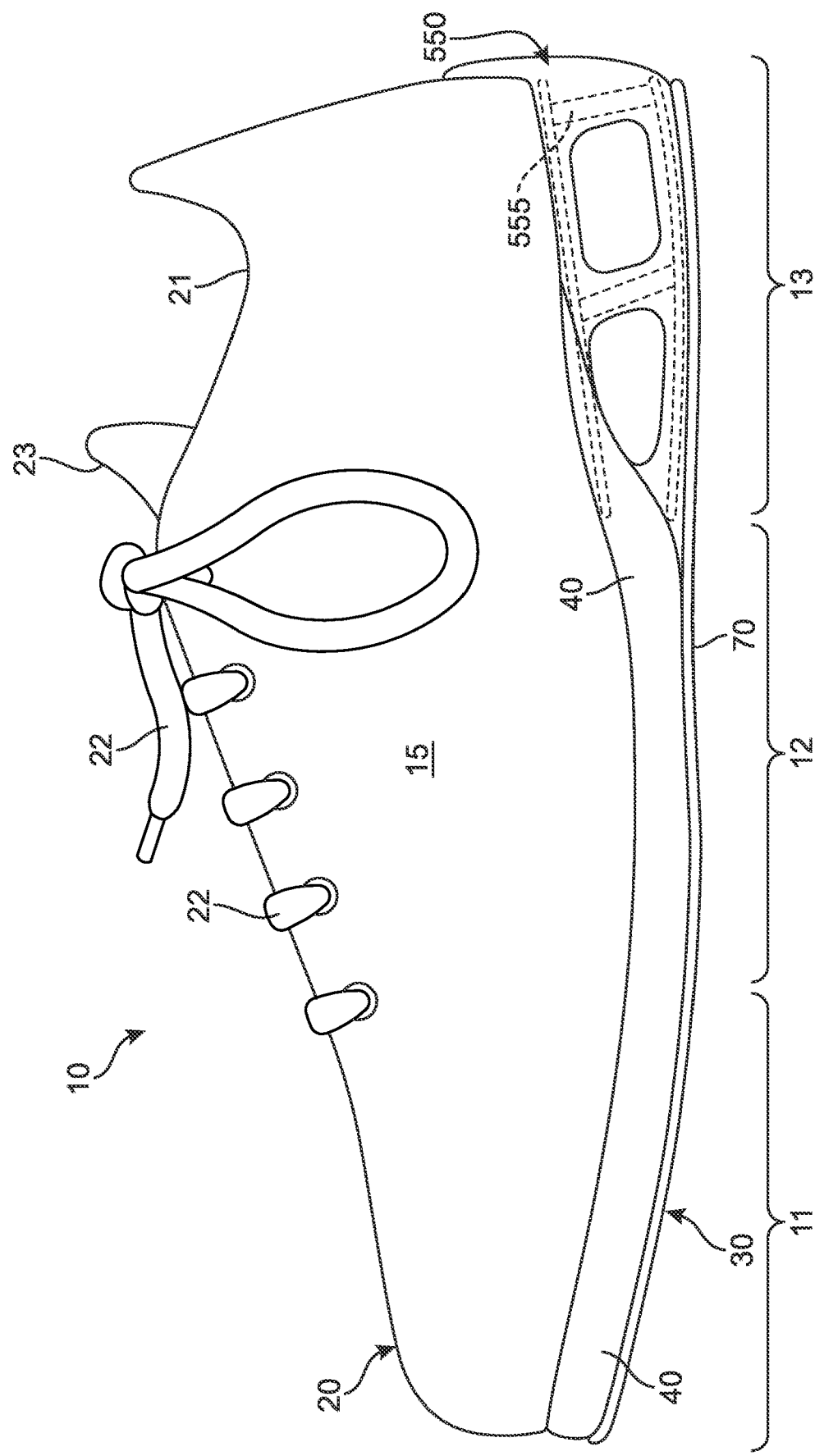
FIG. 13 is a medial side view of an article of footwear including another configuration of an elevated plate structure incorporated within the sole structure and shown in broken lines.
Figure 14:
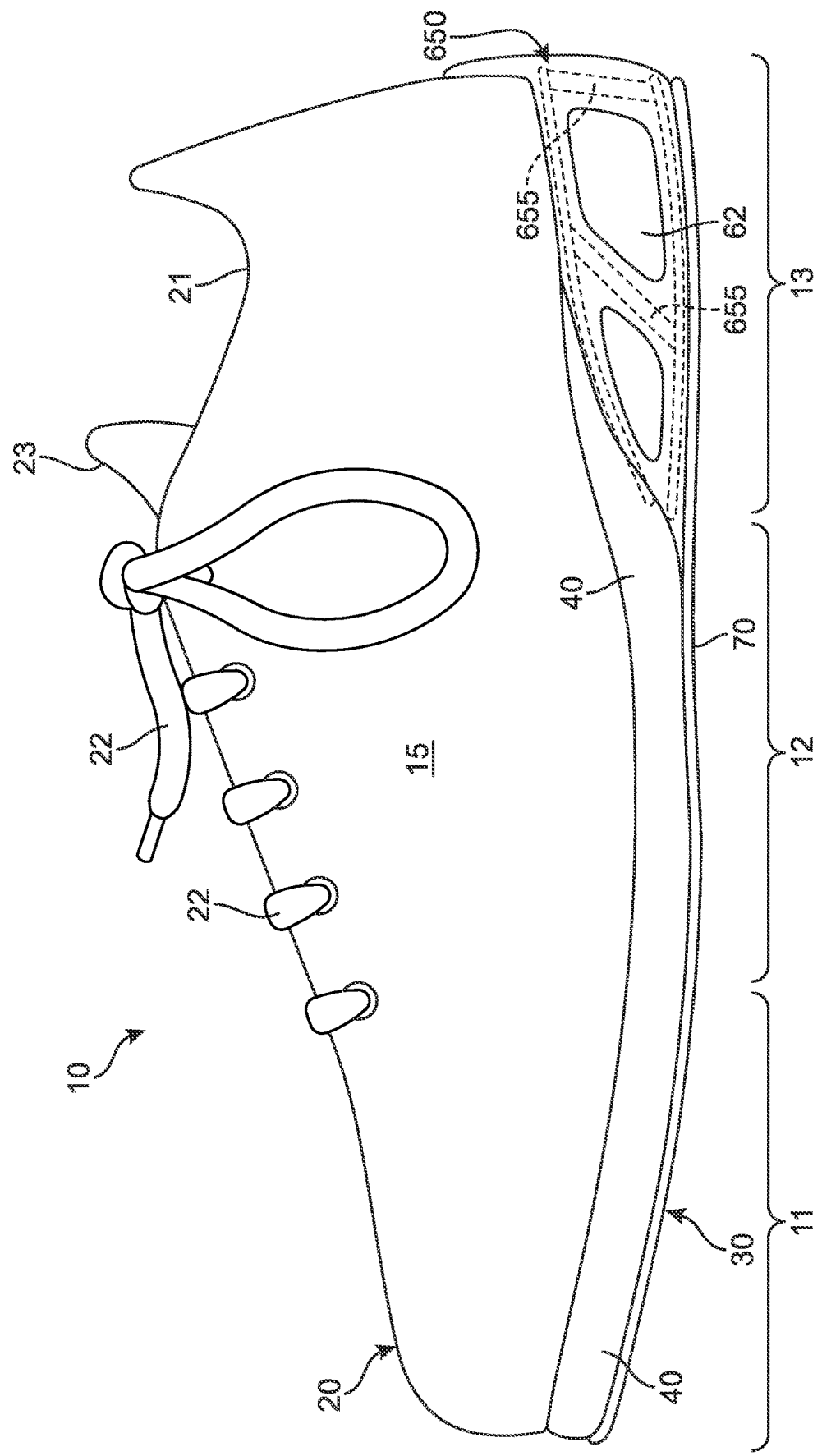
FIG. 14 is a medial side view of an article of footwear including another configuration of an elevated plate structure incorporated within the sole structure and shown in broken lines.

FIGS. 13 and 14 illustrate some of the directional benefits that can be realized through particular configurations of elevated plate structures. Elevated plate structure 550 shown of FIG. 13 includes legs 555 angled forward, whereas elevated plate structure 650 of FIG. 14 includes legs 655 angled rearward. Such configurations can be tailored for specific uses, such as particular sports, and, more particularly, can be configured to provide certain benefits during actions encountered with those sports. For example, it may be beneficial to provide greater support and attenuation of rearward angled impacts to the heel for sports such as basketball, whereas it may be more beneficial to provide greater support and attenuation of forward angled impacts for sports such as soccer. The ability to specifically configure elevated plate structures according to the needs of particular sports and athletic events can be very beneficial.

Figure 15:
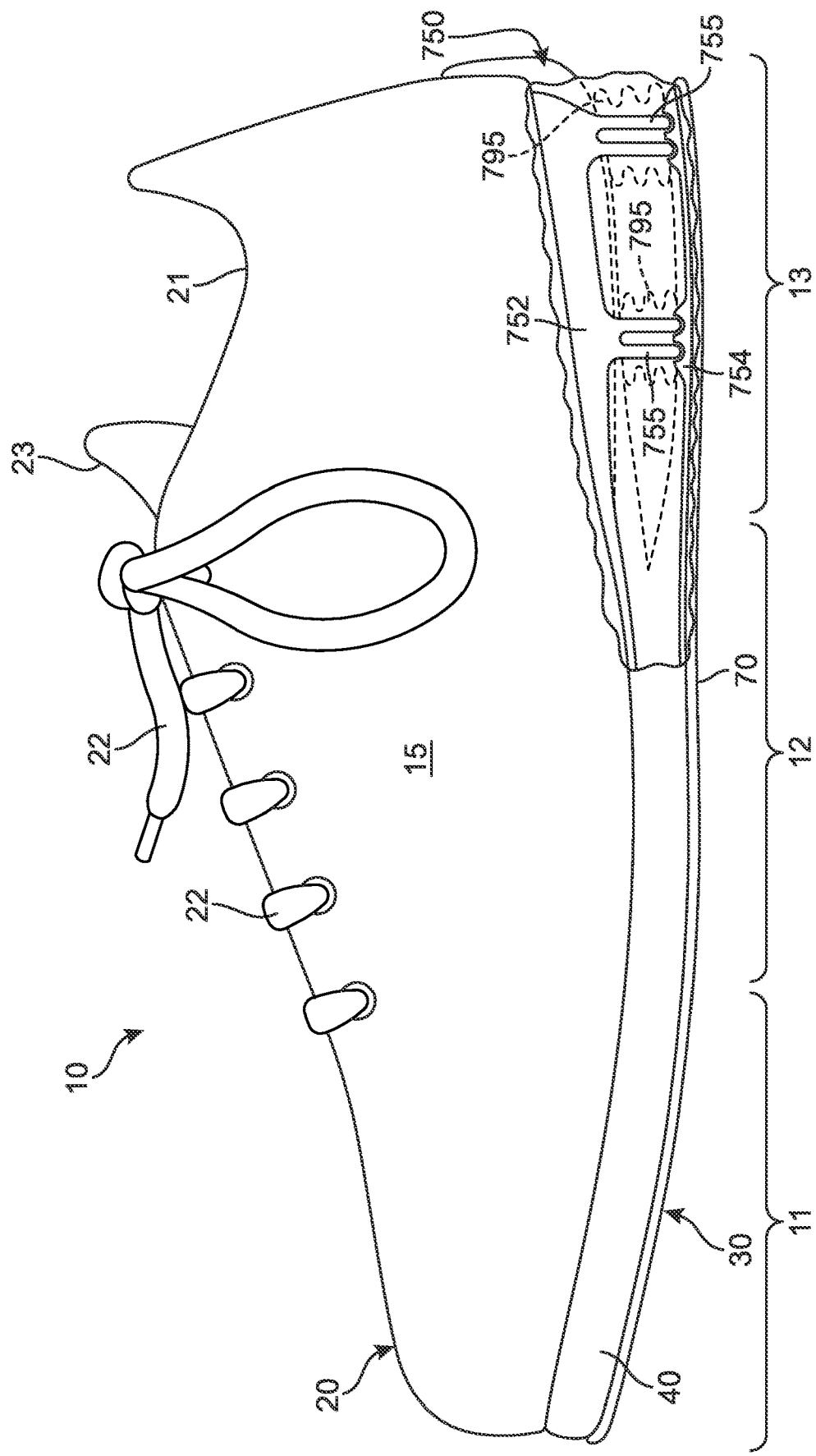
FIG. 15 is a medial side view of an article of footwear including an additional configuration of an elevated plate structure incorporated within the sole structure and showing a portion of the elevated plate structure via a cut-away view in the heel region.

As a further example, it can be beneficial in some athletic activities to provide an elevated plate structure configuration providing exceptional vertical support and attenuation of forces, such as for certain basketball players or other athletes who frequently encounter significant vertical jumps and landings. FIG. 15 depicts an example configuration of an elevated plate structure 750 for such uses. In the example shown, elevated plate structure 750 includes doubled legs 755 extending as posts within shocks 795 in heel region 13, which can provide significant reinforcement and impact attenuation when encountering large vertical forces. In addition, the elevated plate structure 750 includes a thicker upper plate 752 and lower plate 754, which both extend beyond heel region 13 into midfoot region 12. Although not shown, it is understood that elevated plate structure 750 and other elevated plate structures can extend substantially the full length of the article of footwear from the heel region 13 through midfoot region 12 and forefoot region 11, or portions of any these regions as desired for the particular configuration.

Figure 16:
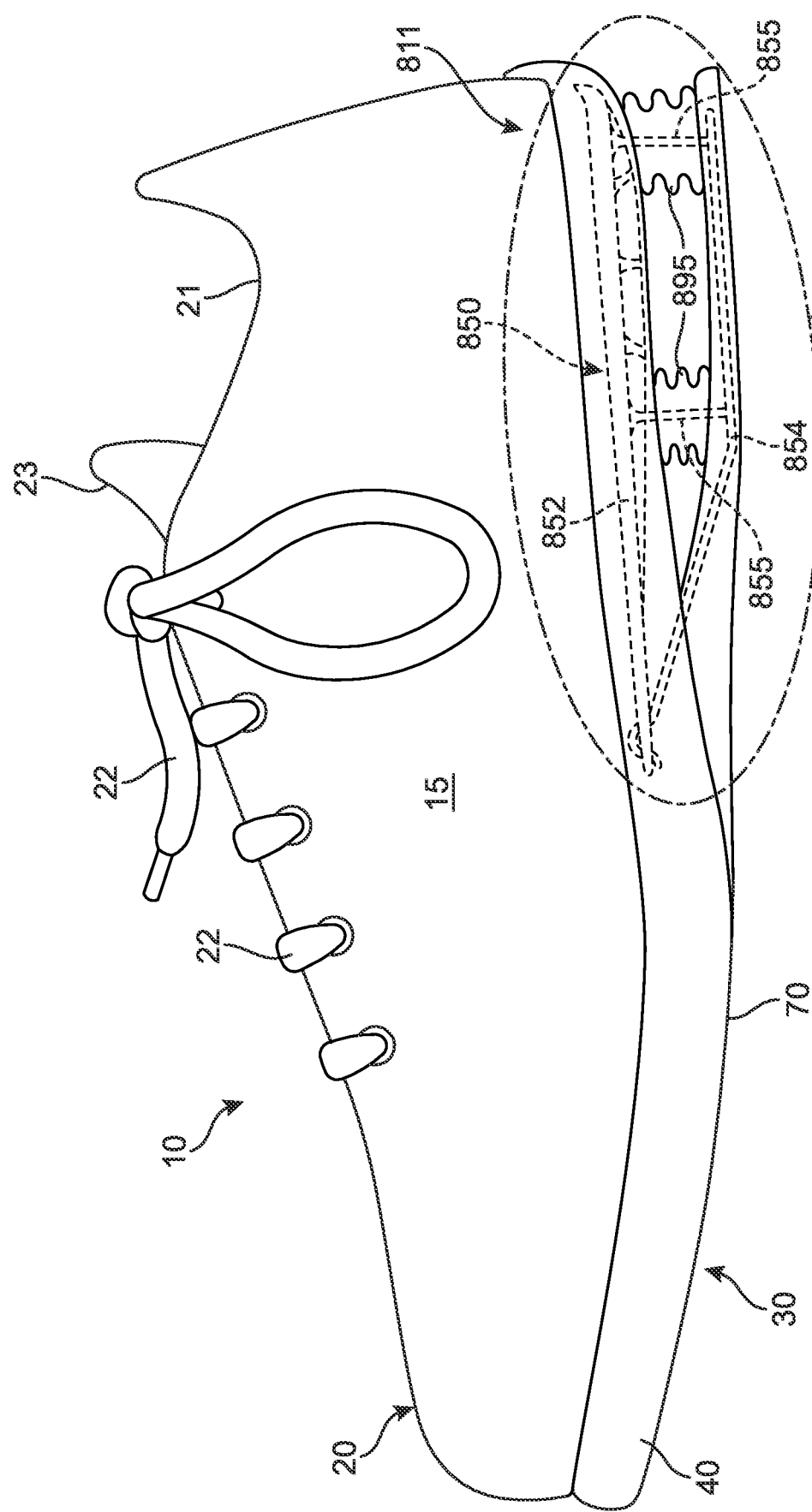
FIG. 16 is a medial side view of an article of footwear including a configuration of an elevated plate structure incorporated within the sole structure.

Referring now to FIG. 16, another configuration of an elevated plate structure 850 is shown as part of article of footwear 10, which includes the aspects and preferences discussed above except as noted herein. In general, elevated plate structure 850 is configured to be integrated with and cooperate with one or more impact-attenuating members 895, which can be disposed in heel region 13, to enhance their performance. Accordingly, the combined configuration of elevated plate structure 850 and impact-attenuating members 895 with which it is integrated, can be referred to as an integrated configuration 811 of an elevated plate structure and impact-attenuating systems. Impact-attenuating members 895 can be formed as columnar impact-attenuating members 895, configurations of which may be known as "SHOX" in reference to commercial products available from NIKE, Inc., of Beaverton, Ore. under the "SHOX" brand trademark. Many configuration options are available for impact-attenuating members including various configurations for different types of articles of footwear and even different configurations for different impact-attenuating members with the same article of footwear. However, integrating non-foamed polymer elevated plate structures, such as elevated plate structure 850, with the impact-attenuating members greatly enhances the range of configuration options and the ability to fine tune the performance features of the integrated impact-attenuating members.

Although the impact-attenuating members shown in the present example and in many other examples herein are illustrated as being generally columnar and being located in the heel region, any number of impact-attenuating members can be provided in the sole structure in many configurations and in varying integrations with elevated plate structure configurations, and at various desired locations. For example, in some configurations, impact-attenuating members can be provided and integrated with elevated plate structure configurations in one or more of the lateral, medial and/or middle longitudinal portions of: (a) the rear portion of the heel region of the sole structure; (b) the central heel portion of the heel region; (c) the forefoot heel portion (e.g., in front of another impact-attenuating member); (d) the midfoot region; and (e) the forefoot region. In many configurations, some or all of the individual impact-attenuation member(s) can be included at locations and orientations so as to be at least partially visible from an exterior of the article of footwear, e.g., akin to commercial products available from NIKE, Inc., of Beaverton, Ore. under the "SHOX" brand trademark. Alternatively, if desired, one or more of the impact-attenuation members can be hidden or at least partially hidden in the overall footwear or foot-receiving device product structure, such as within the foam material of a midsole element, within a gas-filled bladder member, etc.

Further, the impact-attenuating members can be designed and/or configured to provide various levels of resistance to an impact force in differing configurations and in comparison with other impact-attenuating members in the same article of footwear. For example, impact-attenuating members can include stretchable spring or tension elements that are more or less rigid under an impact force as compared with the spring or tension elements of another configuration or of another impact-attenuating member. As another example, different impact-attenuating configurations and differing configurations of members in the same article of footwear can include relatively rigid body members, wherein the body members of one impact-attenuating member are stiffer under an impact force as compared with the body members of another impact-attenuating member (e.g., to thereby make the first impact-attenuating member feel stiffer, less compressible, less expandable, etc.).

As additional examples, the impact-attenuating members can be in the form of column members (optionally elastomeric material-containing column members and/or plastic-containing column members) in which one elastomeric column member has a higher density, is stiffer, and/or are less compressible than another elastomeric column member. If desired, one or more of the impact-attenuating members can be selectively adjustable, wherein one impact-attenuating member is set to a stiffer setting and/or at a stiffer orientation as compared to another impact-attenuating member. In still other examples, if desired, impact-attenuating members can be at least partially contained within retaining structures, wherein various retaining structures are more or less flexible and/or less stretchable than the retaining structure of another impact-attenuating member. The configurability of various features and arrangements of impact-attenuating members can provide many advantages for addressing the varying needs and preferences for articles of footwear, which are used for a wide variety of activities by many different types of users. However, it can be difficult to accommodate large variations of impact-attenuating member configurations in a production environment, or to finely tune their features, based primarily on the use of various materials having different properties to form the impact-attenuating members.

The integration of elevated plate structures with impact-attenuating members can greatly enhance the configurability of the impact-attenuating members and the sole structure's overall impact-attenuating performance features for an article of footwear, and make it easier to accommodate many different variations. As noted above, non-foamed polymer elevated plate structures can be injection molded, which allows them to have a broad range of geometries and other modifiable characteristics in addition to material choices, such as thicknesses, that can be configured in numerous ways. Integrating such non-foamed polymer structures molded in various configurations with the impact-attenuating members likewise extends the range of configurations and performance characteristics for the impact-attenuating members. As such, non-foamed polymer elevated plate structures integrated with impact-attenuating members can provide many and varied sole structure configurations that can provide a wide range of performance features as desired for various articles of footwear and uses. Example configurations of elevated plate structures integrated with impact-attenuating members disclosed herein illustrate some of the types of beneficial integrated arrangements that can be provided, as well as advantages that can be provided from the combination of these technologies and the features selected for the particular configurations.

Referring back to the configuration of FIG. 16, which is also shown in FIGS. 17-20, elevated plate structure 850 generally includes an upper plate 852 embedded in midsole element 40, a lower plate 854 embedded in outsole 70, and a plurality of legs 855 extending downward from upper plate 852 and connecting with an upper surface of lower plate 854. Similar to elevated plate structure 750, each one of legs 855 of elevated plate structure 850 are integrated with and extend through a central portion of an impact-attenuating member 895, which are columnar in the configuration shown in FIGS. 16 and 17. Lower portions of legs 855 that extend through respective impact-attenuating members 895 are integrated with and form a portion of the respective overall impact-attenuating member 895.

Figure 17:
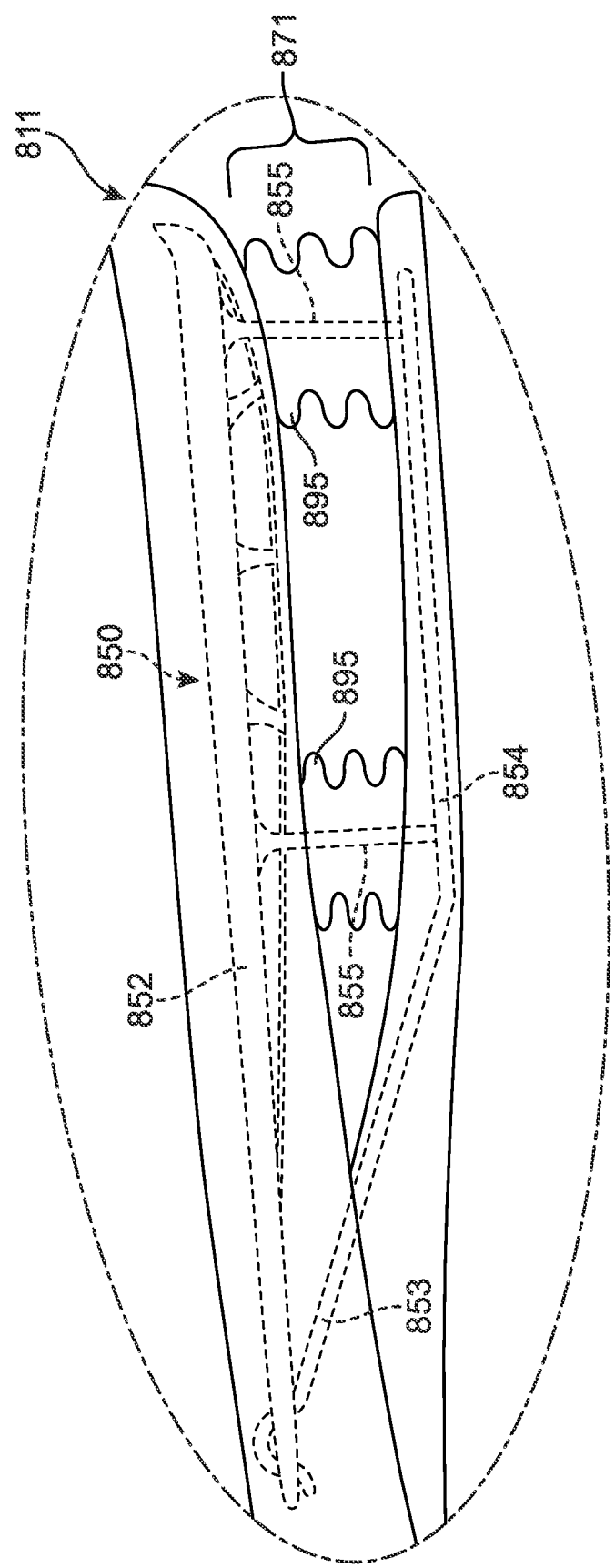
FIG. 17 is a close side view of a portion of the heel region of FIG. 16.

For example, as shown in FIG. 17, a lower portion 871 of a rearward leg extends through and is integrated with rearward impact-attenuating member 855. In its upright configuration, lower leg portion 871 acts as a central column in the rear impact-attenuating member and, thus, has a column strength up to its buckling point that can resist downward impacts. As such, the overall impact-attenuating performance of rear impact-attenuating member 895 for absorbing downward impacts up to the column strength of lower leg portion 871 can be a combination of the impact-attenuating characteristics (e.g., compressibility) of the impact-attenuating member apart from lower leg portion 871 and the column strength of lower leg portion 871. The geometry of leg 855 and lower leg portion 871 can be configured relatively easily to increase or reduce its column strength as desired, such as providing a larger or smaller width, including a more rigid cross-sectional shape like a cross shape, or having a less rigid cross-sectional shape like a rectangle. Accordingly, overall impact-attenuating performance characteristics of impact-attenuating member 895 when initially encountering a downward impact can be fine-tuned based on modifying the configuration of rear leg 855 and its column strength.

When the column strength of integrated column 871 is met while encountering a downward impact, it is considered to have reached its buckling point, at which point it begins to bend. After reaching its buckling point, lower leg portion 871 bends as it continues to encounter the downward impact, during which it acts as a living hinge. The overall impact-attenuation characteristics of impact-attenuating member 895 during this phase of the impact would be a combination of the characteristics of lower leg portion 871 when acting as a living hinge and the characteristics of the remainder of the impact-attenuating member 895. Similar to the phase noted above prior to the lower leg portion reaching its buckling point, the configuration of leg 855 can be modified to fine tune its performance during this phase while acting as a living hinge, such as via geometry changes that can affect its bending, through modifications to the non-foamed polymer material forming the leg 855 and the elevated plate structure to provide different material properties, and via the manner in which the lower leg portion is integrated with the impact-attenuating member and interacts with the member during bending.

In addition to providing further configurability to impact-attenuating member 895 when integrated therein, the integration of lower leg portion 871 also enables enhanced performance characteristics during impact-attenuation. For example, if impact-attenuation of rear impact-attenuation member 895 is generally a single state performance curve based on the compressibility of the impact-attenuation member without lower leg portion 871, then integrating lower leg portion 871 therein can provide a multi-stage performance curve for the integrated member. In particular, lower leg portion 871 resists compression when receiving a downward impact up to the point of buckling during a first phase, and bends and acts as a living hinge after reaching the buckling point during a second stage. Thus, during the first stage, the integrated impact-attenuation member 895 has a first set of impact absorption characteristics of minimal compression when initially receiving a downward impact, and, during the second stage, a second set of impact-absorption characteristics of providing much larger compression when receiving a larger portion of the downward impact after the lower leg portion has reached its buckling point.

Figure 18:
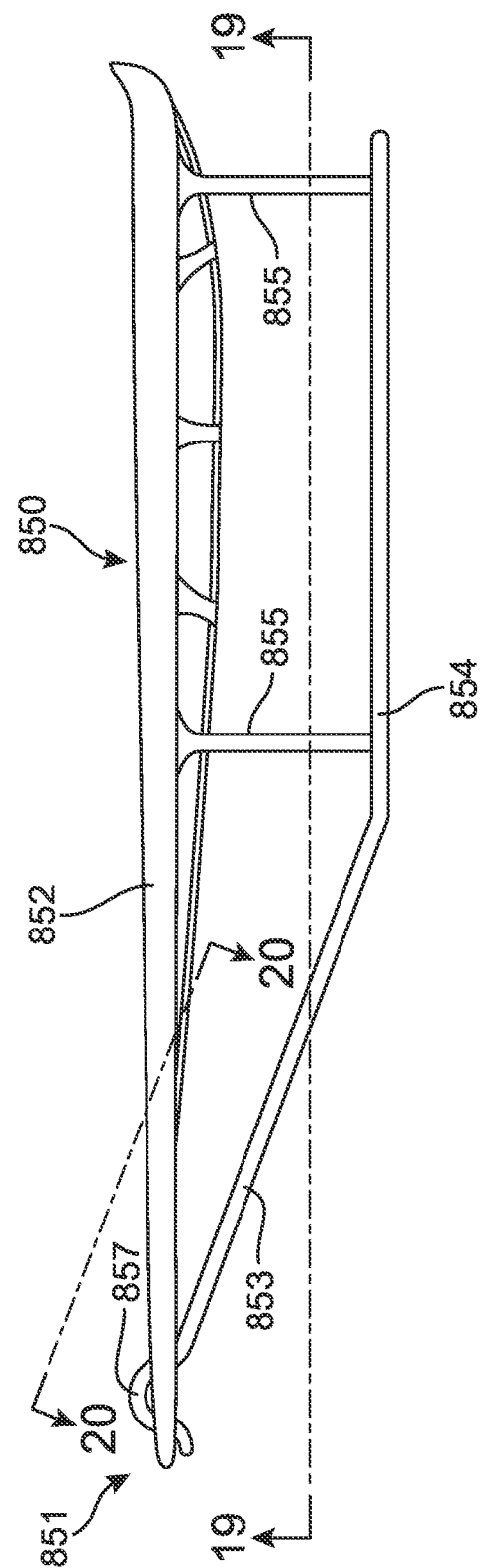
FIG. 18 is a side view of the elevated plate structure of FIGS. 16 and 17.
Figure 19:
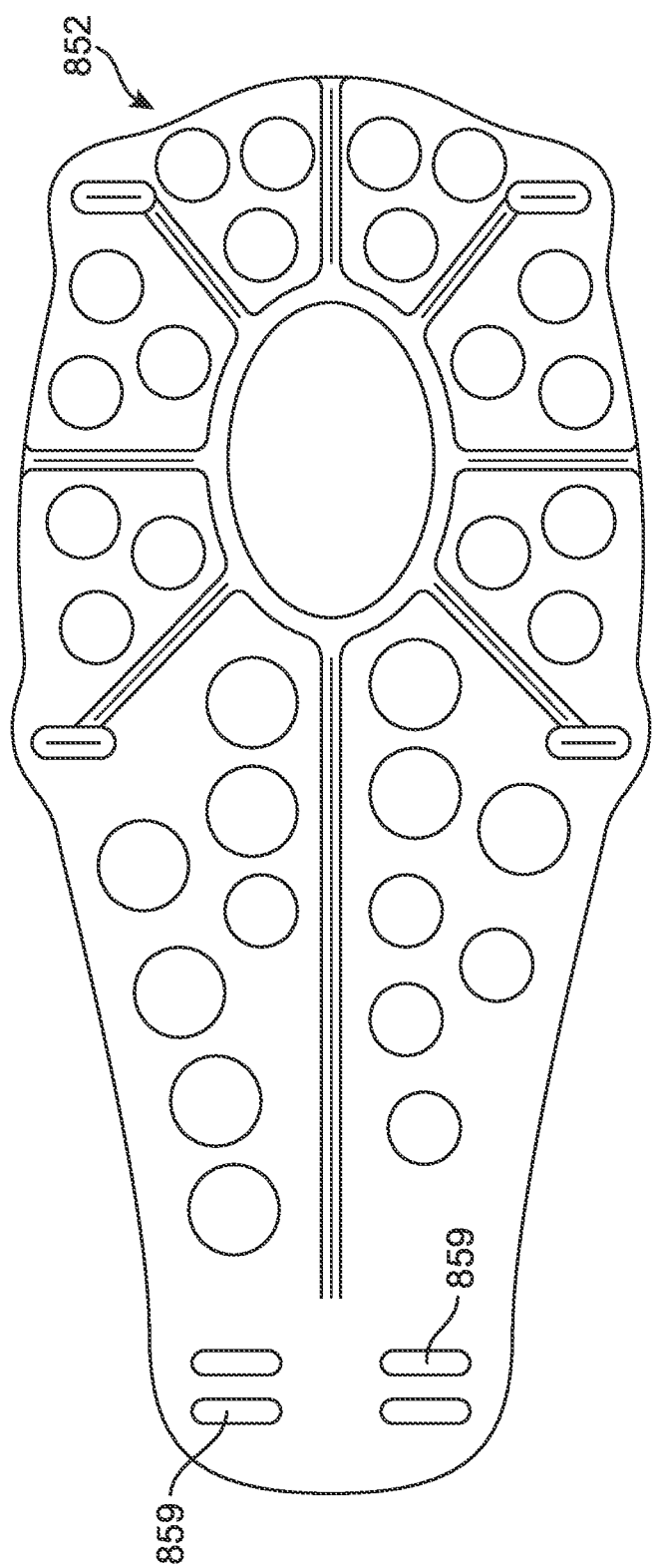
FIG. 19 is a bottom view of an upper plate of the elevated plate structure of FIG. 18 as viewed from Line 19-19 in FIG. 18.
Figure 20:
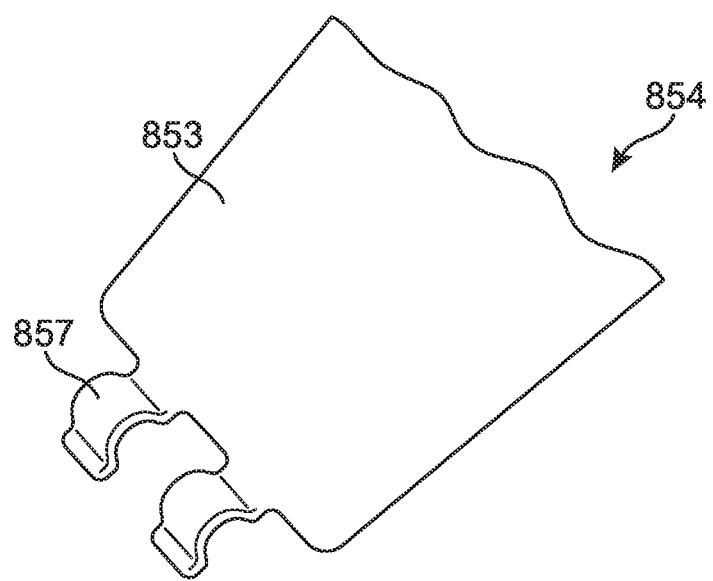
FIG. 20 is a top view of a connector portion of the lower plate of the elevated plate structure of FIG. 18 as viewed from Line 20-20 in FIG. 18 and shown with the upper plate removed, which shows optional connectors that attach the lower plate with the upper plate at its mid-foot end.

As shown in FIGS. 18-20, elevated plate structure 850 can also include the feature of a secure connection 851 between upper plate 852 and lower plate 854 at its forward end. The forward end of lower plate 854 includes an extension 853 that angles upward to meet a forward end of upper plate 852 proximate the midfoot region 12. The forward end of lower plate 854 includes a set of hooks 857 that engage a set of corresponding slots 859 formed through a forward end of upper plate 852 and securely attaches the lower plate to the upper plate. As discussed above for other elevated plate structures, lower end portions of legs 855 can be attached to an upper portion of lower plate 854 in various ways, such as via an adhesive bond and/or being received in recesses formed in the top of the lower plate. The optional feature of secure connection 851 can enhance these attachments and the stability of elevated plate structure 850, as well as improve the integrity of structural support it provides to sole structure 30, while allowing configurability and manufacturability advantages that can be provided by forming upper plate 852 separately from lower plate 854 (e.g., via injection molding) and attaching them to each other thereafter.

Figure 21:
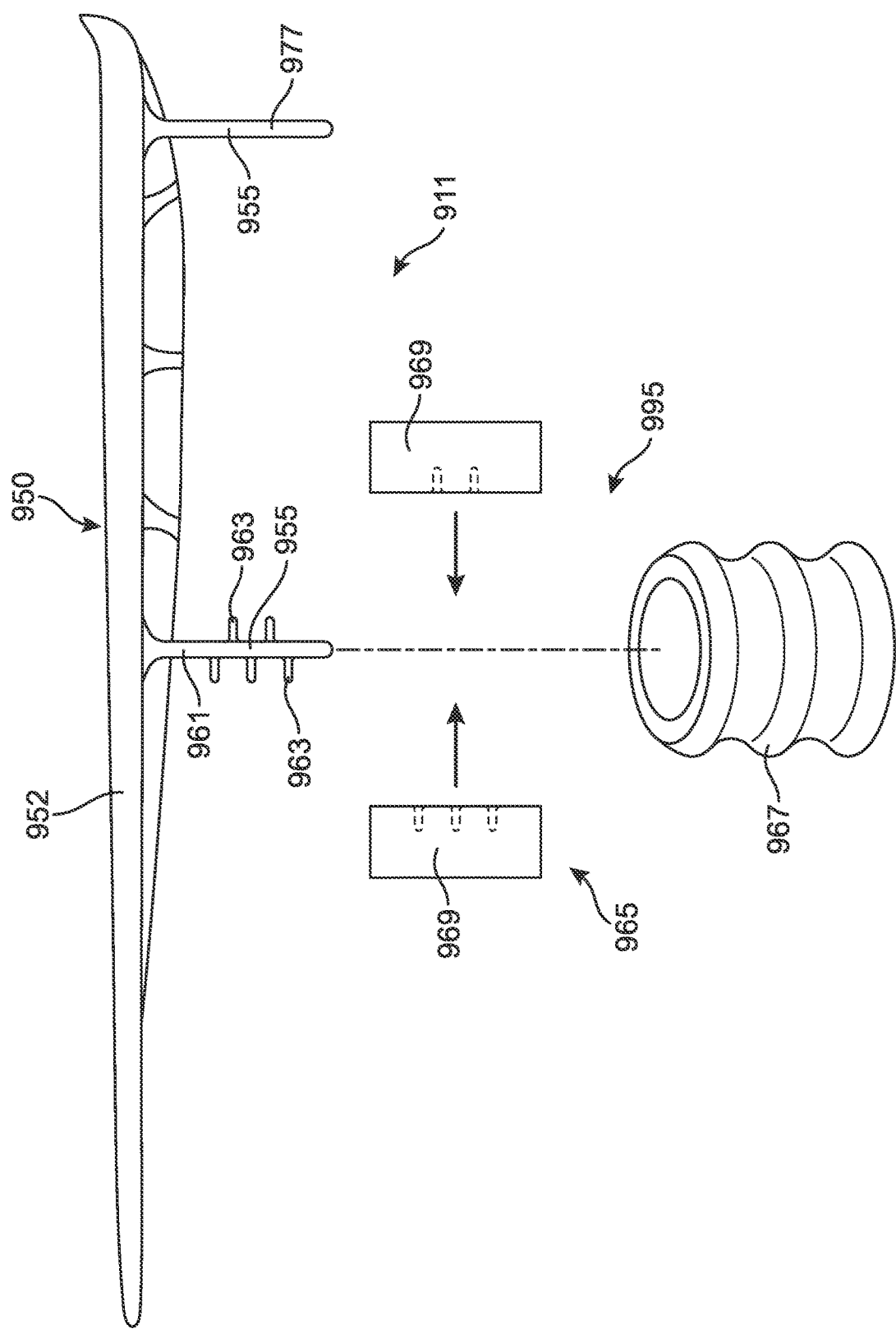
FIG. 21 is an exploded side view of an alternative configuration of the elevated plate structure of FIGS. 16-19 shown with portions of a corresponding impact-attenuating member.
Figure 22:
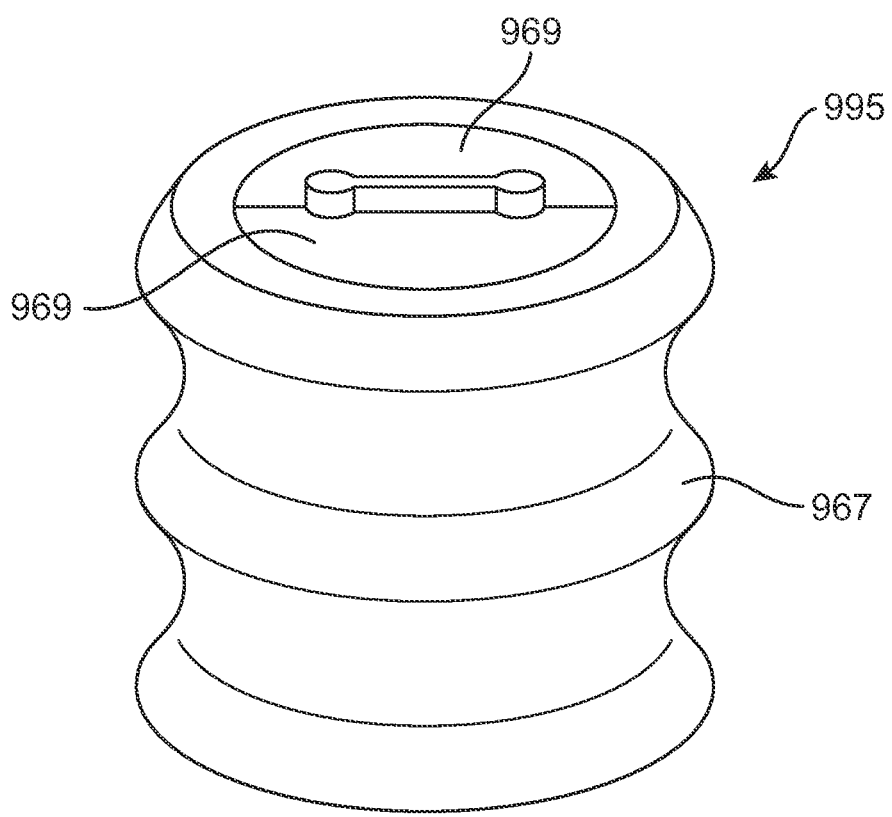
FIG. 22 is a perspective view of the assembled portions of the impact-attenuating member of FIG. 21.
Figure 23:
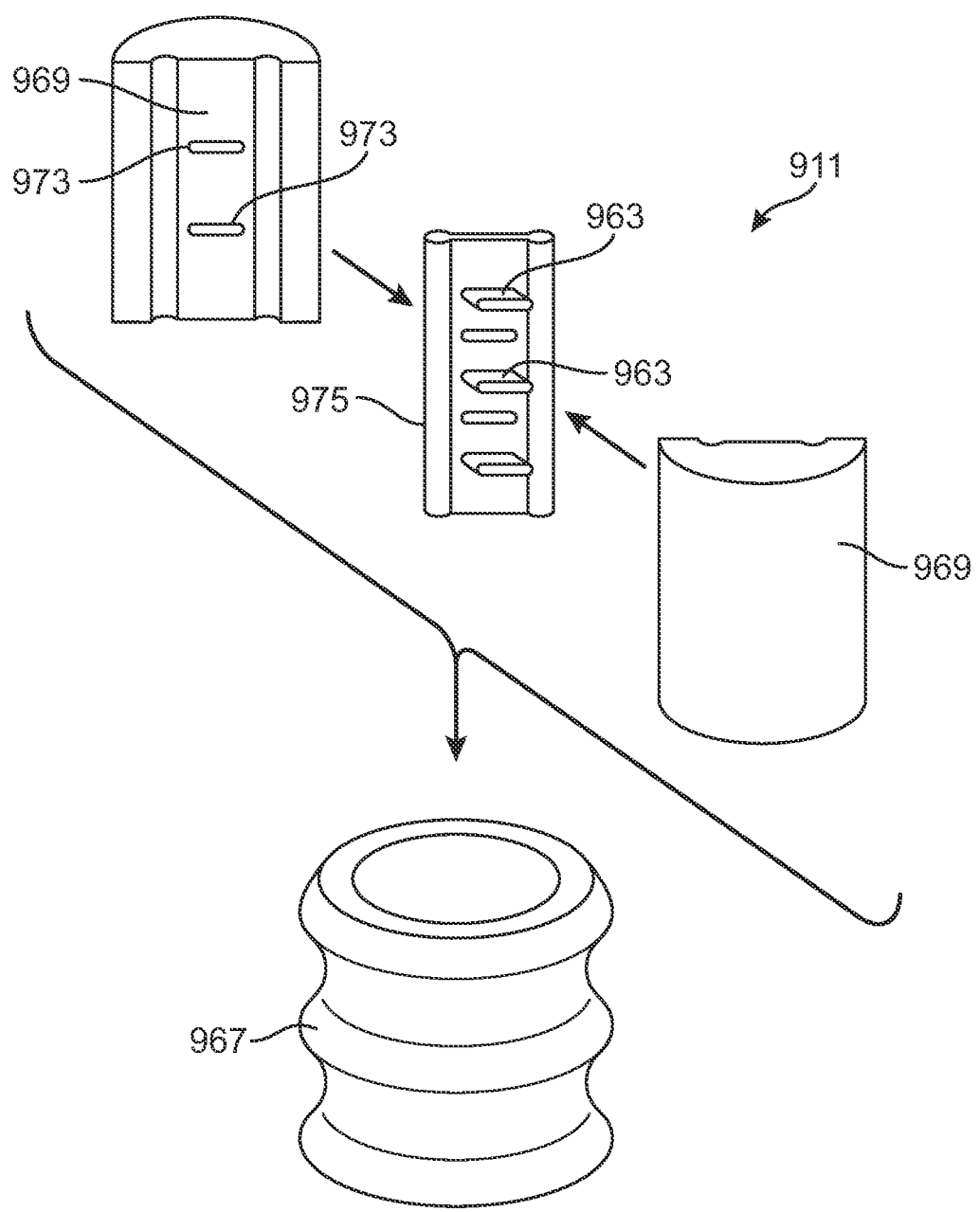
FIG. 23 is an exploded view of the impact-attenuating member of FIGS. 21 and 22 along with a lower leg portion of the elevated plate structure extending into the impact-attenuating member.

Referring now to FIGS. 21-23, an additional configuration 911 of an elevated plate structure 950 integrated with impact-attenuating members 995 is generally shown. The configuration of FIGS. 21-23 generally includes the aspects and features of configuration discussed along with FIGS. 16-20 except as noted herein. In particular, elevated plate structure 950 differs from elevated plate structure 850 in that at least one of its legs 955, such as forward medial leg 961, includes a plurality of laterally extending tines 963. Further, impact-attenuating member 995 includes a core 965 formed about a lower portion of forward medial leg 961, and an outer shell 967, in which core 965 is formed from a pair of mating half-shells 969. The mating half-shells attach to opposite sides of the lower portion of forward medial leg 961 and tines 963 extending from the leg are received in corresponding recesses 973 formed in the half-shells. Outer shell 967 is generally formed as a hollow cylinder that surrounds the half-shells attached to the lower portion of leg 961.

Varying configuration features of the elevated plate structure 950 and, in particular, of lower leg 961, can enhance performance features of the integrated impact-attenuating member 995 based on how lower leg 961 is integrated with the impact-attenuating member in addition to varying performance characteristics of the lower leg. In other words, modifying the way the lower leg integrates with the impact-attenuating member can enhance performance characteristics of the integrated unit beyond modifying characteristics of the component. For example, tines 963 extending laterally from leg 961 and engaging half-shells 969 can enhance the ability of the assembly to act as an integrated unit, such as after the lower portion of leg 961 has reached its buckling point and is acting as a living hinge, which can additional improve performance of the integrated unit. The engagement of tines 963 into half-shells 969 via recesses 973 can increase the bend strength of the living hinge due to its engagement of the half-shells. Further, it can encourage the overall impact-attenuating member 995 to act as a single unit having impact-attenuating performance characteristics when receiving greater downward impacts based on the overall configuration of the unit of the half-shells rather than features of the components, such as via reinforcement features provided by the half-shells sandwiching the lower leg portion 961 and being engaged by the tines that increase its bending strength.

As another example, leg 961 can include additional structural features, such as a rib extending about its perimeter, that can increase its vertical strength and more securely retain the mating half-shells in the assembled configuration to enhance performance of the integrated unit. Further, configuration features of the impact-attenuating members can also enhance performance of the integrated impact-attenuating member. For example, as noted above, recesses 973 formed in half-shells 969 to receive tines 963, and even the half-shell configuration itself that accommodates tines 963, enhances the ability of the integrated member to act as a unit when receiving downward impacts. Further, features of outer shell 967 can enhance performance of the integrated impact-attenuating member 995, such as having a rigidity that is greater than the rigidity of core 965, which can increase the integrated impact-attenuating member's ability to resist bending.

Although these features are shown and described for a forward medial impact-attenuating member, they can be applied to other impact-attenuating members as desired including being applied to all impact-attenuating members or only select impact-attenuating members. Specialized performance features for the article of footwear can be provided by having different integrated impact-attenuating member configurations at different locations in sole structure 30. For example, instead of the configuration discussed above for forward medial impact-attenuating member 967, rearward medial leg 977 in an integrated arrangement with the corresponding rearward medial impact-attenuating member can have a different integrated configuration, such as being configured as discussed previously along with FIGS. 16-20. That is, rearward medial leg 977 can be configured in an arrangement that lacks tines 963, which can permit the rearward medial integrated impact-attenuating member to have greater shock-absorption performance characteristics when receiving the large portion of a downward impact as discussed along with FIGS. 16-20 after the lower leg portion has reached the buckling point in comparison with integrated forward medial impact-attenuating member 995 having the tines configuration. Such differing performance characteristics can be desirable, such as for permitting greater shock-absorption at the rear portion of the heel and less shock-absorption near the midfoot region while the article of footwear encounters a downward impact.

Figure 24:
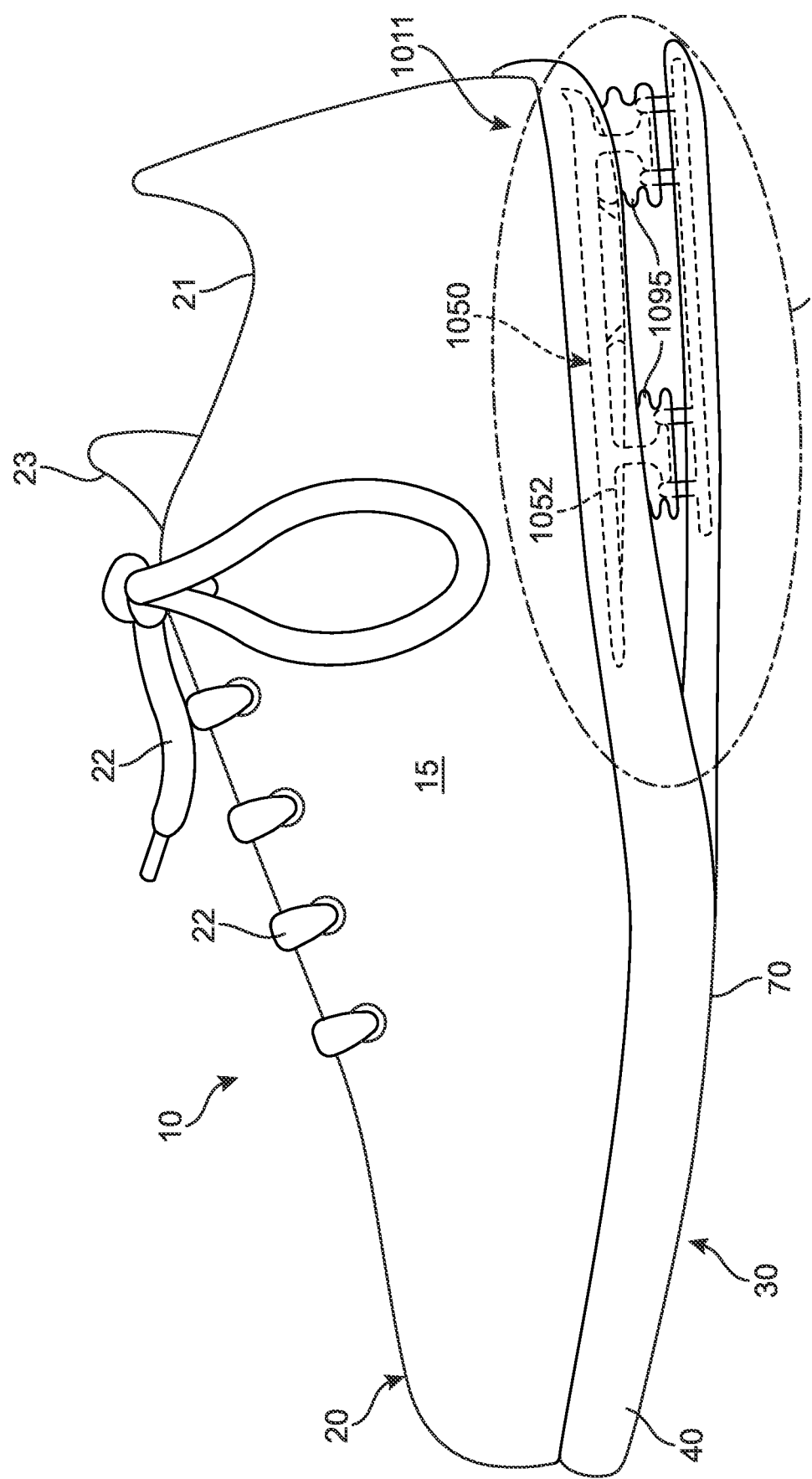
FIG. 24 is a medial side view of an article of footwear including a configuration of an elevated plate structure incorporated within the sole structure in a cooperative shock-absorbing arrangement with impact-attenuating members in the heel region.
Figure 25:
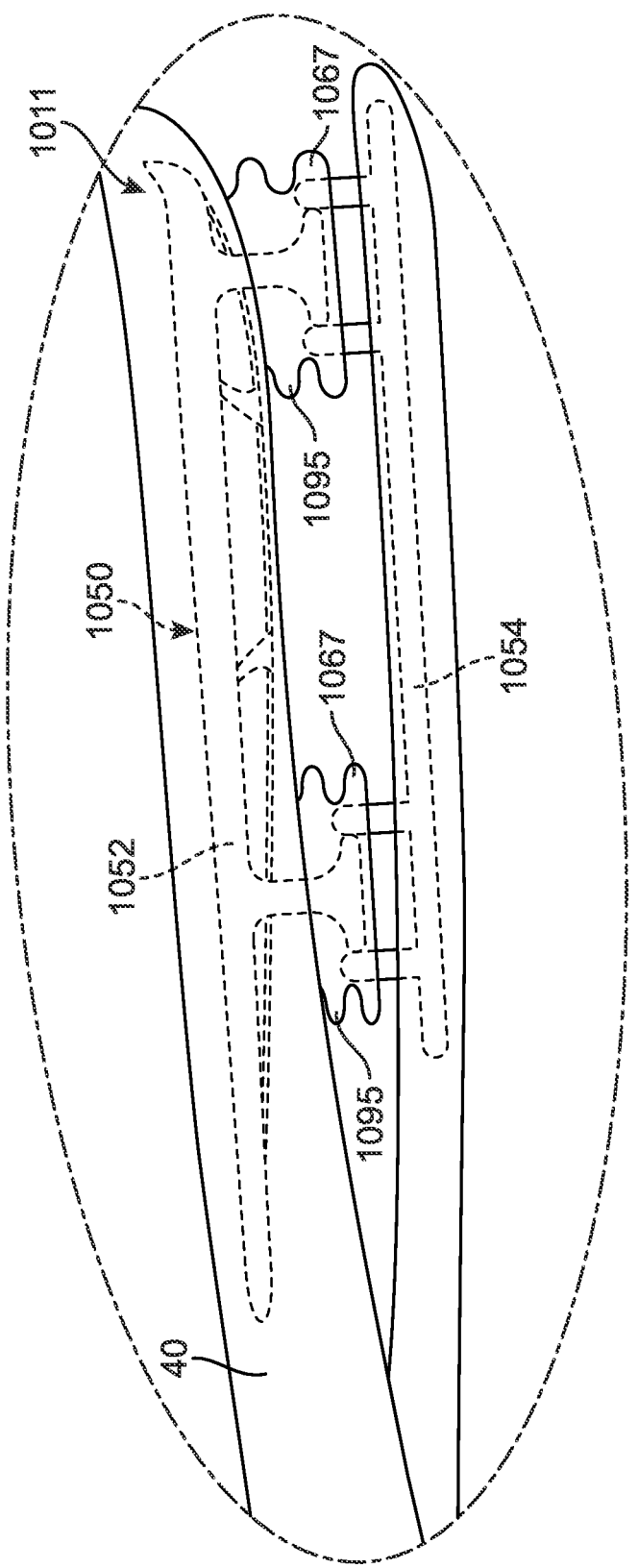
FIG. 25 is a close view of a portion of the heel region of FIG. 16.
Figure 26:
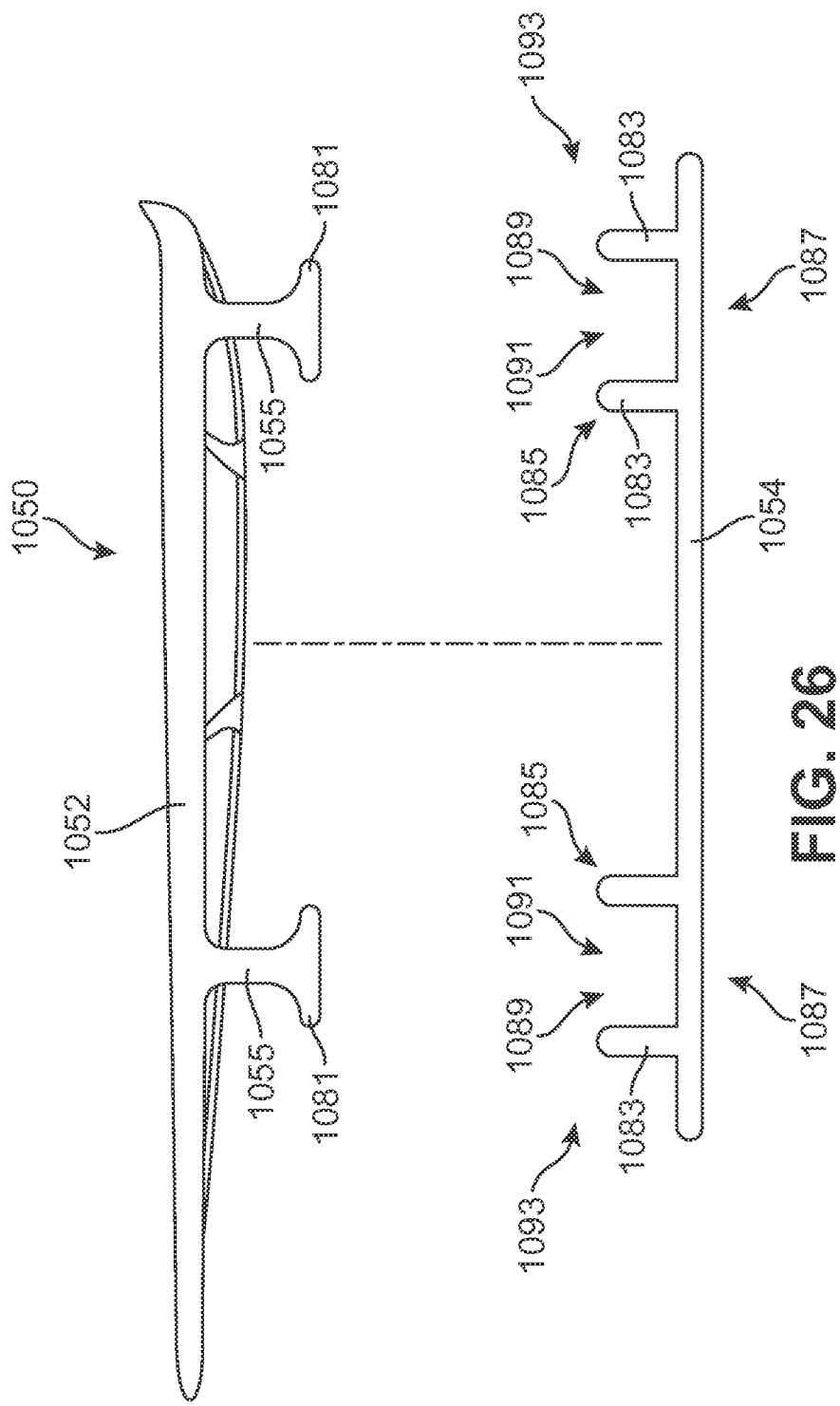
FIG. 26 is an exploded side view of the elevated plate structure of FIGS. 24 and 25.

Referring now to FIGS. 24-26, another configuration 1011 is shown of an elevated plate structure 1050 integrated with impact-attenuating members 995, which generally includes the aspects and features discussed above along with elevated plate structures 850 and 950 except as noted herein. As best shown in FIGS. 25 and 26, elevated plate structure 1050 generally includes an upper plate 1052, a lower plate 1054, legs 1055 extending downward from a lower surface of the upper plate that form pistons 1081 at their distal ends, and projections 1083 extending upward from an upper surface of the lower plate that form a hollow container 1085. Hollow container 1085 includes a closed end 1087 proximate the upper surface of lower plate 1054, sidewalls formed from projections 1083, and an opening 1089 formed by upper distal ends of projections 1083. Hollow container 1085 is configured to receive piston 1081 through opening 1089 into its interior 1091 in an upright translating arrangement. The cross-sectional shapes of piston 1081 and hollow container 1085 are similar to allow to mate and enable sliding engagement of the piston within the container, such as having a circular cross-sectional shape.

The piston 1081 of each leg 1055 and the corresponding hollow container 1085 receiving the piston together form a dashpot 1093 in each of the corresponding impact-attenuation members 1095. Dashpot 1093 can act to absorb energy during downward impacts and dampen those impacts, which can reduce jarring and other effects of impacts felt by the user and to improve performance of the impact-attenuation members. The impact-attenuation members 1095 can include a resilient shell 1067 surrounding the dashpot and optionally other components, such as a resilient core (not shown), which can provide other impact-attenuating features to act in concert with the integrated dashpot configuration. For example, shell 1067 can be formed from a resilient foamed polymer or other material that can act as a spring to resist displacement, absorb impacts and restore the pre-impact configuration. Optional other components, such as a resilient core (not shown) disposed around the dashpot within the shell can provide further impact-attenuating features, such as reinforcing the spring actions of the shell.

Figure 27:
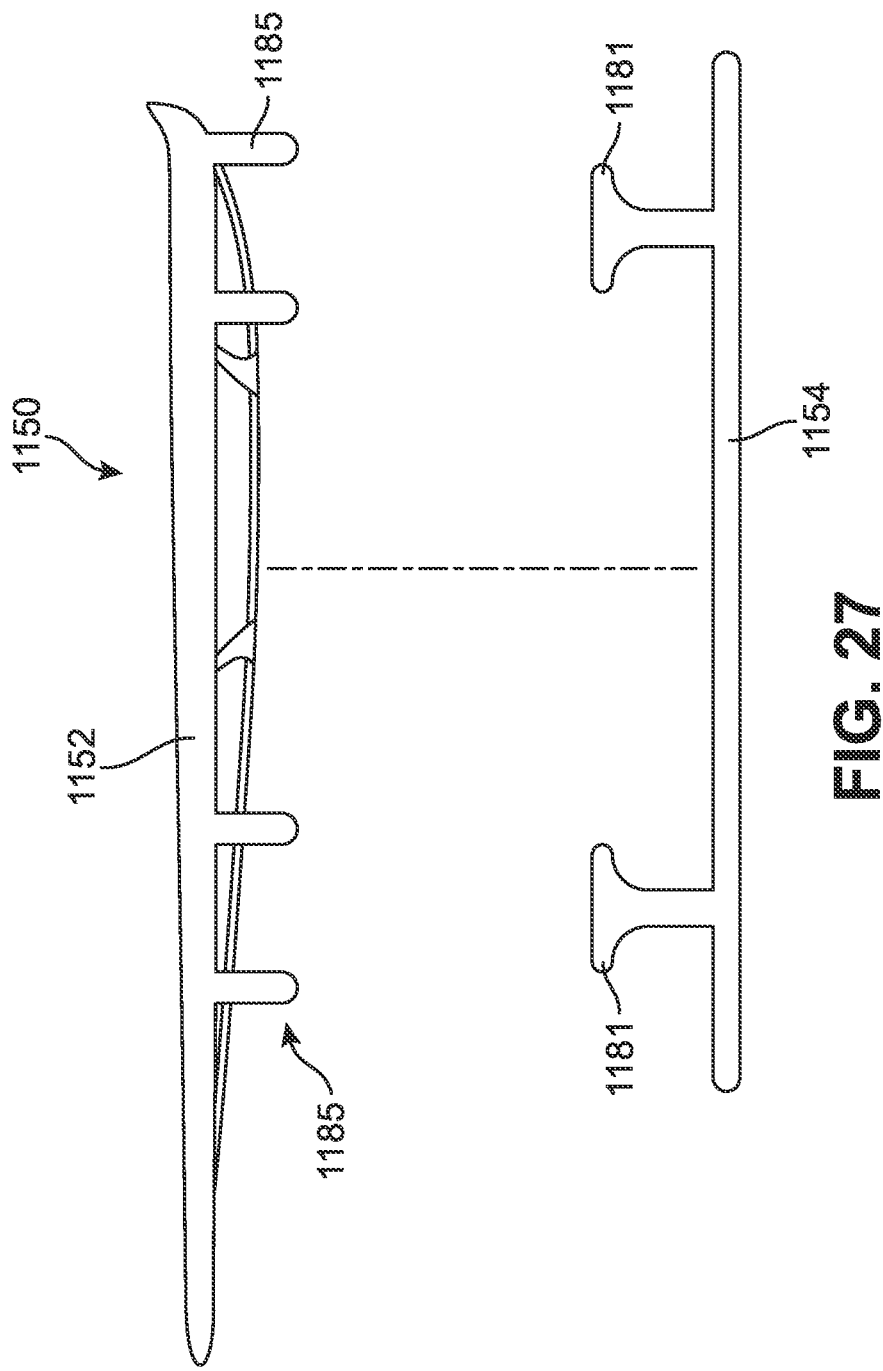
FIG. 27 is an exploded side view of an alternative arrangement for the elevated plate structure of FIGS. 24 and 25 in which shock-absorbing features are reversed to include pistons on the lower plate and receiving containers on the upper plate.
Figure 28:
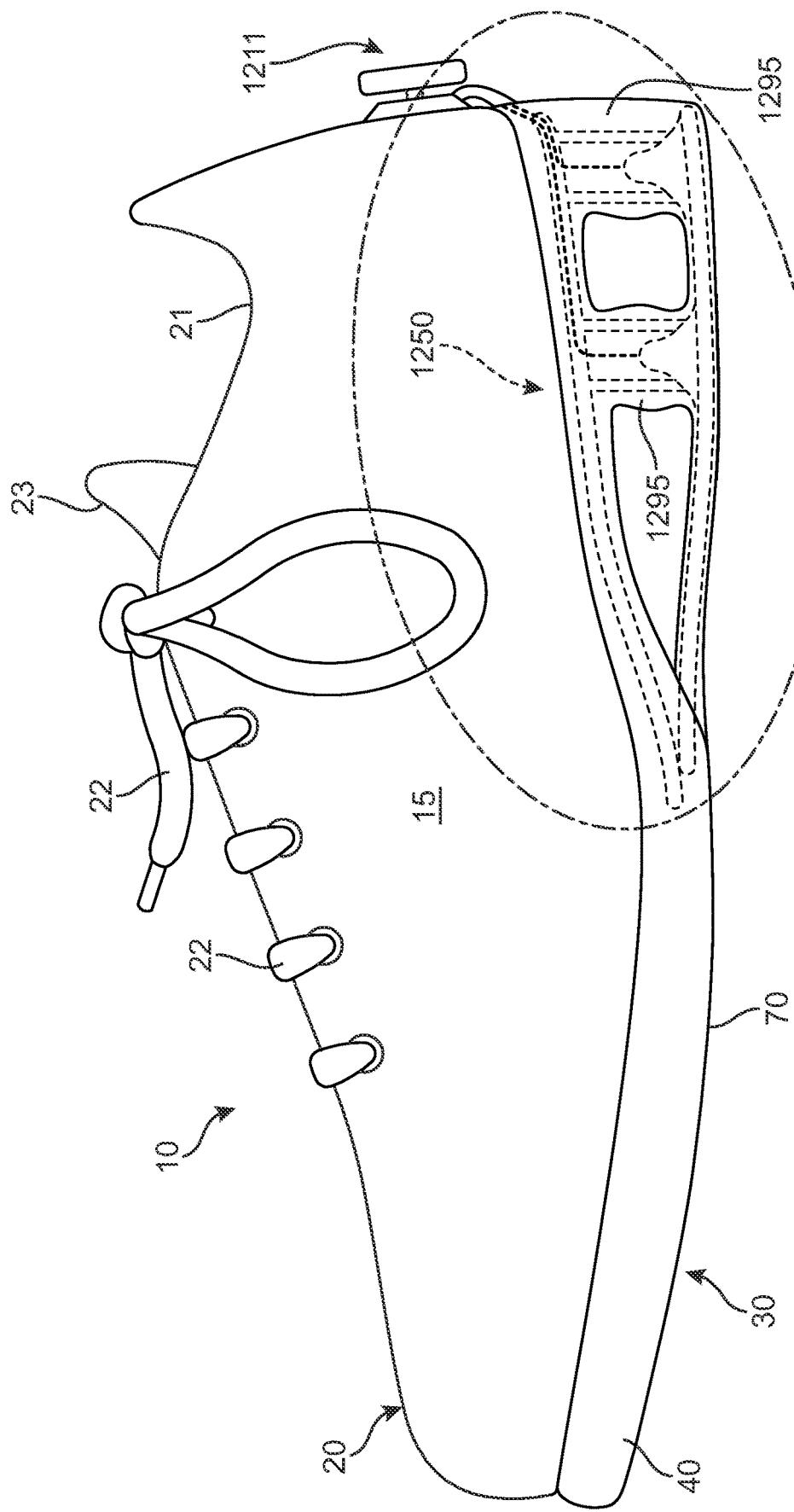
FIG. 28 is a medial side view of an article of footwear including a configuration of an elevated plate structure incorporated within the sole structure in an adjustable shock-absorbing arrangement with impact-attenuating members in the heel region.

Although the configuration of the elevated plate configuration 1050 shown in FIGS. 25 and 26 shows pistons 1081 extending downward from the upper plate 1052 and the corresponding containers 1085 shown as formed from projections 1083 extending from the lower plate 1054, it is understood that other dashpot arrangements could be used. For example, FIG. 27 shows an alternative arrangement of an elevated plate structure 1150 having pistons 1181 formed on extensions from the lower plate 1154 and containers 1185 formed from extensions from the upper plate 1152.

Figure 29:
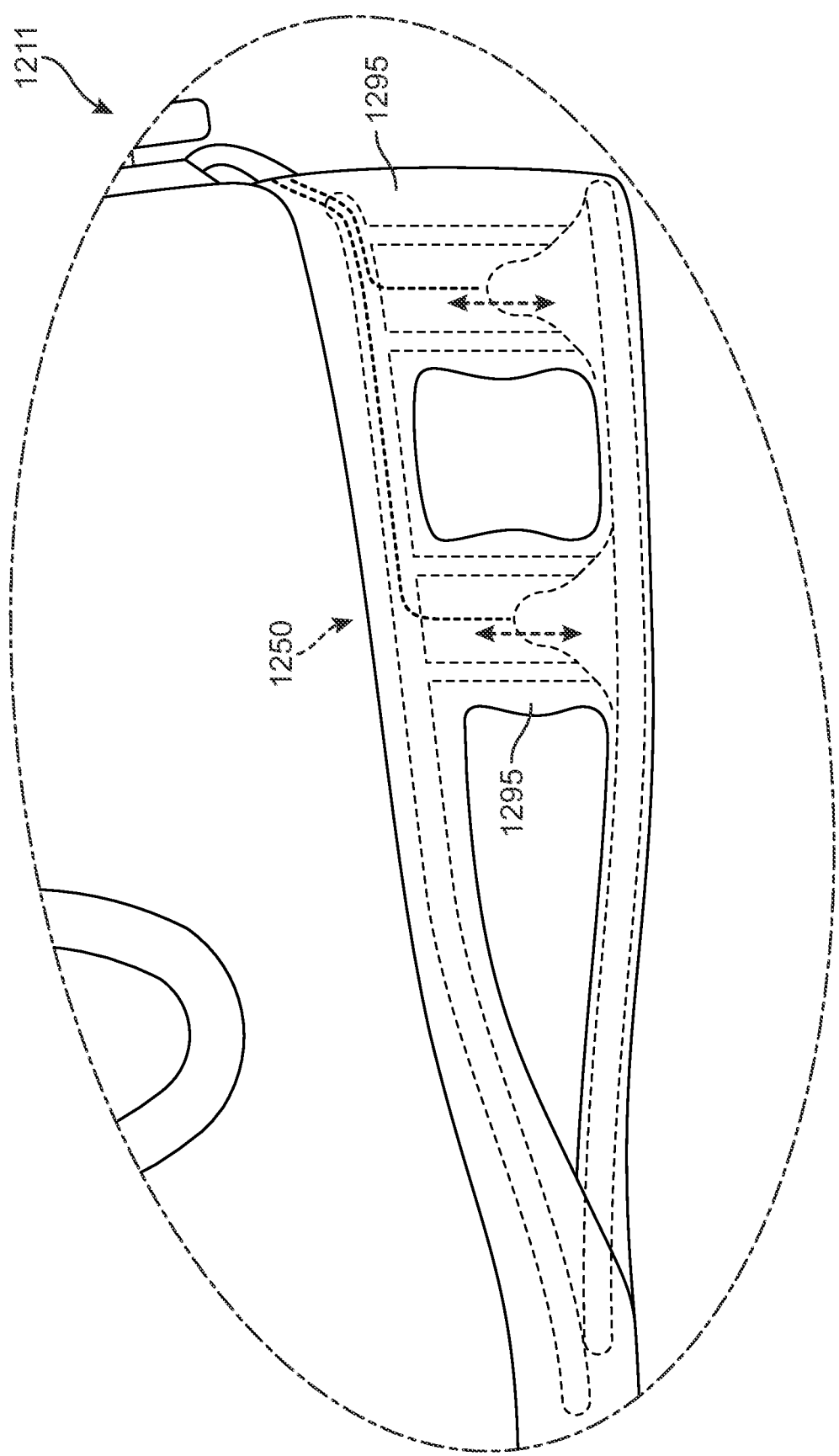
FIG. 29 is a close side view of a portion of the heel region of FIG. 28 showing the elevated plate structure in its adjustable shock-absorbing arrangement with impact-attenuating members.

Referring now to FIGS. 28-35, another integrated configuration 1211 is shown of an elevated plate structure 1250 with impact-attenuating members 1295. The configuration of FIGS. 28-35 generally includes the aspects and preferences of previously discussed elevated plate structures integrated with impact-attenuating members, such as elevated plate structures 750, 850, 950 and 1050 integrated with impact-attenuating members 795, 895, 995 and 1095. As shown in FIG. 29, impact-attenuating member 1295 can be formed as molded upright supports 1295 that are generally created, for example, along with molding midsole 40, as well as being formed as generally columnar impact-attenuating members as depicted for impact-attenuating members 695, 795, 895, 995 and 1095.

Figure 30:
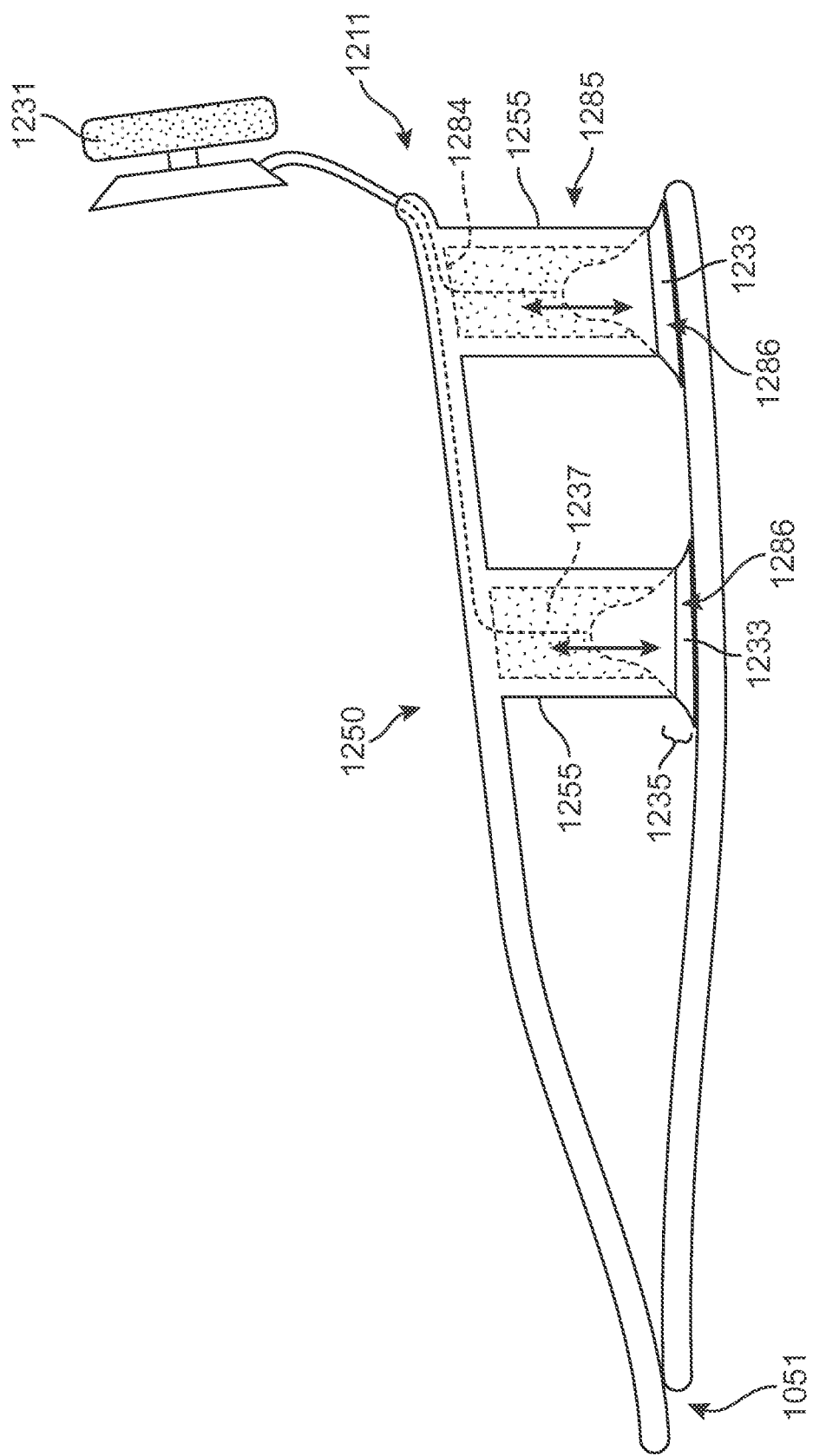
FIG. 30 is a side view of the elevated plate structure of FIGS. 28 and 29 shown in a full impact-absorption adjustment position.

Integrated configuration 1211 primarily differs from previous configurations in that it includes features permitting the user to selectively adjust impact-attenuation settings. For example, as generally shown in FIG. 30, a user-adjustable control device 1231 can be disposed in an easily accessible location for the user, such as a rear portion of the heel. Such an arrangement can allow the user to modify impact-attenuation settings as desired, such as for an anticipated use of the article of footwear in the near future that would likely expose the user's feet and article of footwear to different types and intensities of impacts, or simply for accommodating changing comfort preferences of the user. Integrated configuration 1211 can allow the user to change settings on control device 1231 easily, such as by rotating a dial on the device. The changed settings can cause a resilient plug 1233 slidably disposed in a hollow container 1285 to raise or lower and, thus, provide more or less impact-attenuating engagement when impacts are received, as well as to expose, modify or cover a gap 1235 (not shown in FIG. 30; see FIGS. 34 and 35) that also changes the amount and type of impact attenuation provided.

Elevated plate structure 1250 includes an upper plate 1252, a lower plate 1254, legs 1255 extending downward from upper plate 1252 and a connection 1051 between the upper plate and lower plate at their forward ends. The connection 1051 can be similar to secure connection 851 shown in FIG. 18 or it can be another type of connection, such as provided via an adhesive bond. Legs 1255 extending downward from upper plate 1252 can form a hollow container 1285 having sidewalls 1283, a closed upper end 1284 proximate the lower surface of upper plate 1252, and an opposite open end 1286 formed at the lower distal ends of the sidewalls. The hollow container 1285 can be configured to house a resilient plug 1233 in a sliding arrangement within the channel, which, as discussed further below, can modify the amount and type of impact attenuation provided. A compressible spring 1237 can optionally be disposed between an upper portion of the plug and the upper closed end 1284 of hollow container 1285 to urge plug 1233 in a downward direction to attempt to exit the channel through open end 1286. The compressible spring 1237 can include a foam material or other compressible material.

Plug 1233 can be formed from a resilient impact-attenuating material having desired properties, such as a relatively firm rubber polymer material that can absorb impacts and act as a spring thereafter to apply a restoring force. Various rubber polymer materials that can be suitable for plug 1233 include styrene-butadiene rubber, urethane, polyurethane, polyester, polyester polyurethane, and polyether polyurethane. Various thermoset polymer materials can also be utilized for plug 1233. Plug 1233 can be shaped to expose varying amounts of its resilient material for use with attenuating impacts and to encourage its movement within hollow container 1285. For example, an upper surface 1241 of plug 1233 can be curved and, in some configurations, substantially bell-shaped, such that it is increasingly compressed as it moves upward into lower end opening 1286 of the hollow container. Accordingly, expansion forces from portions of the plug compressed within hollow container 1285 and contacting inner walls 1243 of the container can urge the plug to move downward in the hollow container and to attempt to exit through opening 1286. Angled mouth portions 1245 of container opening 1286 can further encourage movement in the downward direction.

Accordingly, plug 1233 can be configured to be biased in a downward direction to exit open end 1286 based on its design—either with or without the use of optional spring 1237. However, optional spring 1237 can enhance its movement and, thus, overall operation of integrated configuration 1211's adjustment features by supplementally biasing plug 1233 in the downward direction toward exiting the hollow container.

A flexible axial link 1239 can restrain plug 1233 from moving downward according to its bias and can draw it upward in an opposite direction according to the adjustable settings for control device 1231. Flexible axial link 1239 is a connector that can transmit tensile forces along its axis through a non-linear path, such as a cable, a wire, a lace, an elongate bundle of polymeric threads, etc. It can include a combination of materials for beneficial purposes, such as a wire configured to transmit axial forces and an elastomeric coating around the wire, which can enhance its ability to move within a channel. Further, it can include a sheathed arrangement to enhance its movement along a path, such as a wire coaxially and moveably disposed within a protective sheath. One end of axial link 1239 can be attached to control device 1231 and its opposite end can be connected to plug 1233 for restraining and controlling its movement within hollow container 1285.

Figure 31:
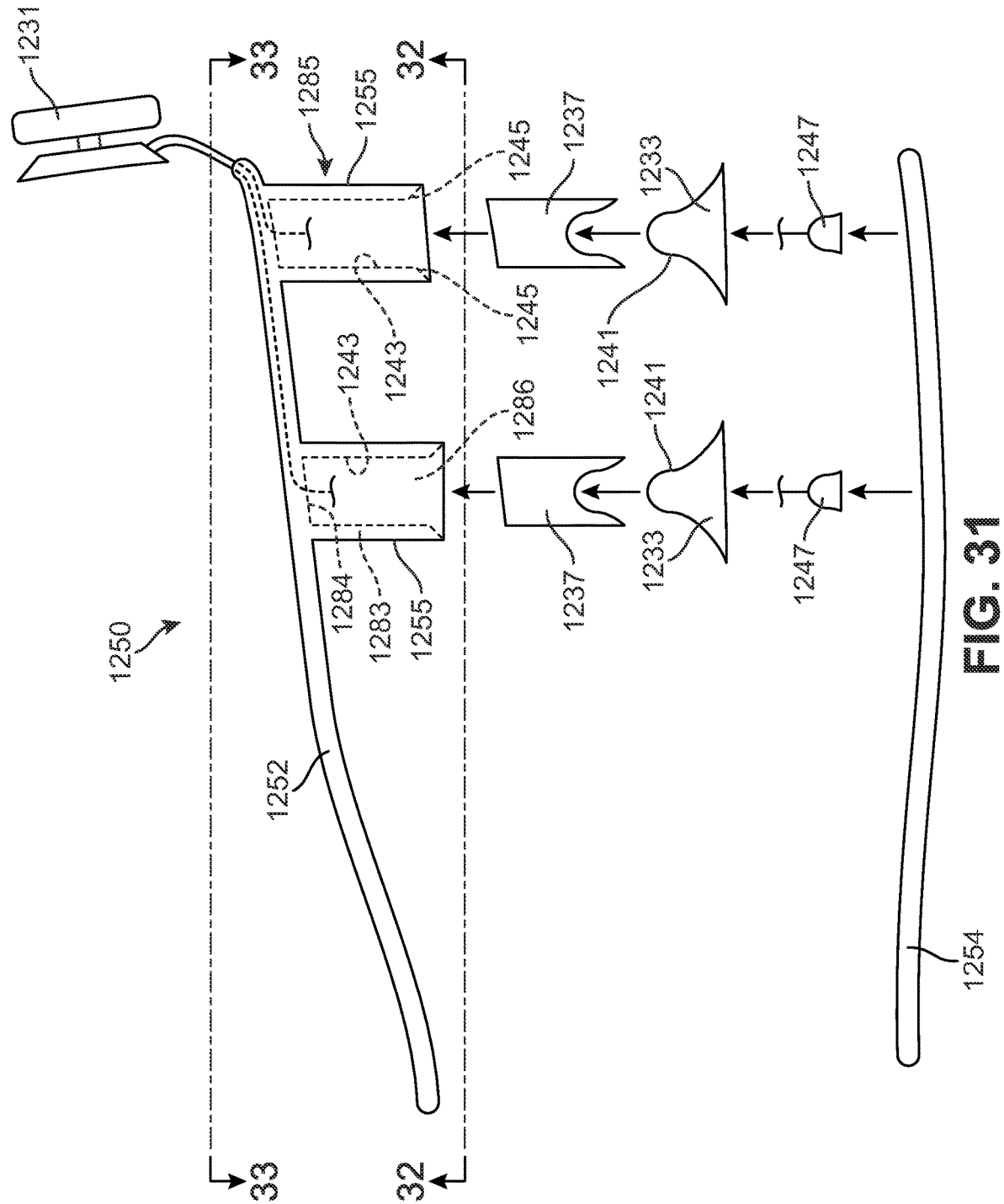
FIG. 31 is an exploded side view of the elevated plate structure of FIGS. 28-30 and related elements for adjustment of impact-attenuation.
Figure 32:
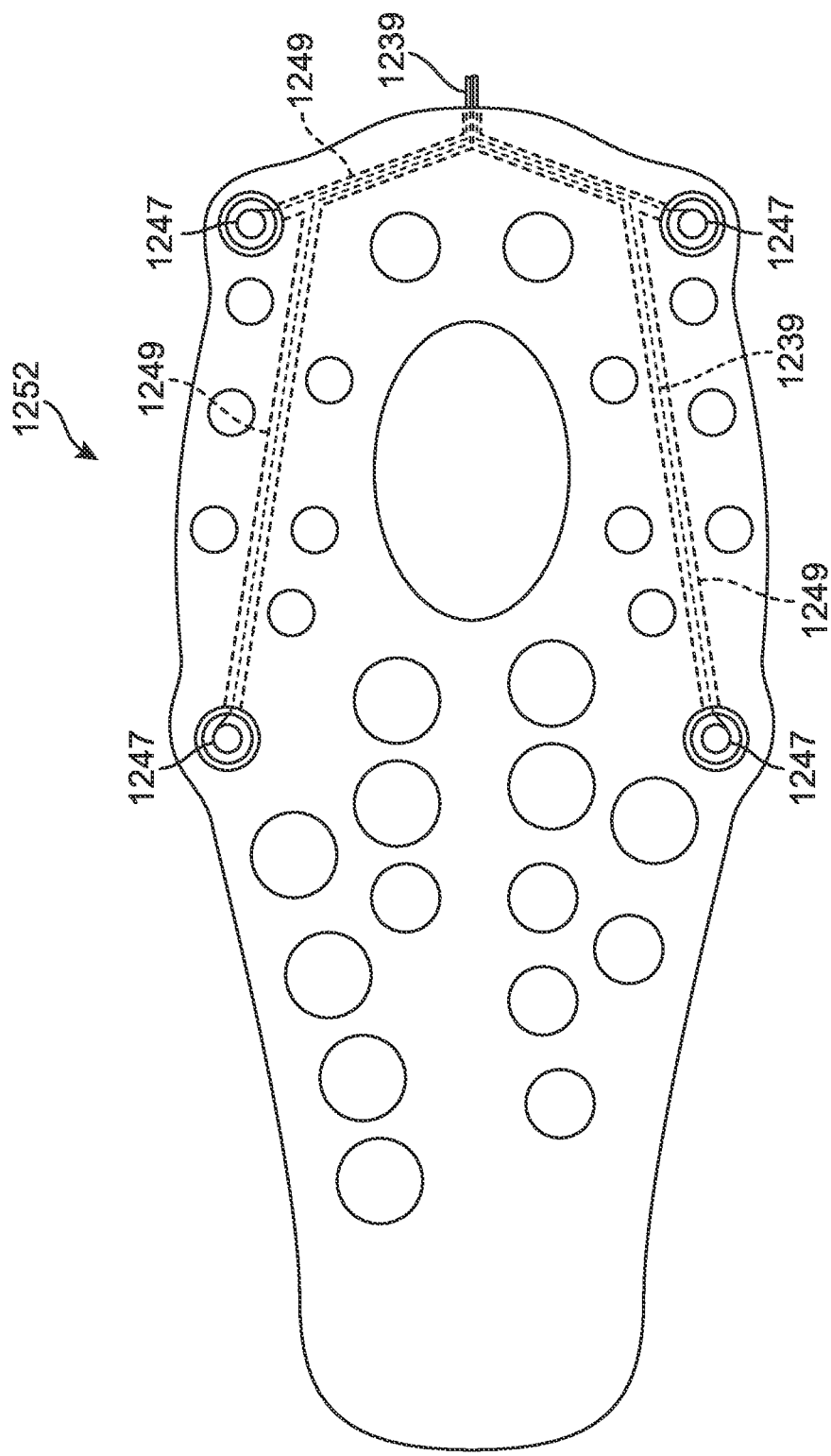
FIG. 32 is a bottom view of the top plate of the elevated plate structure of FIGS. 28-31 as viewed from line 32-32 in FIG. 31 including portions of the impact-attenuation adjustment components.
Figure 33:
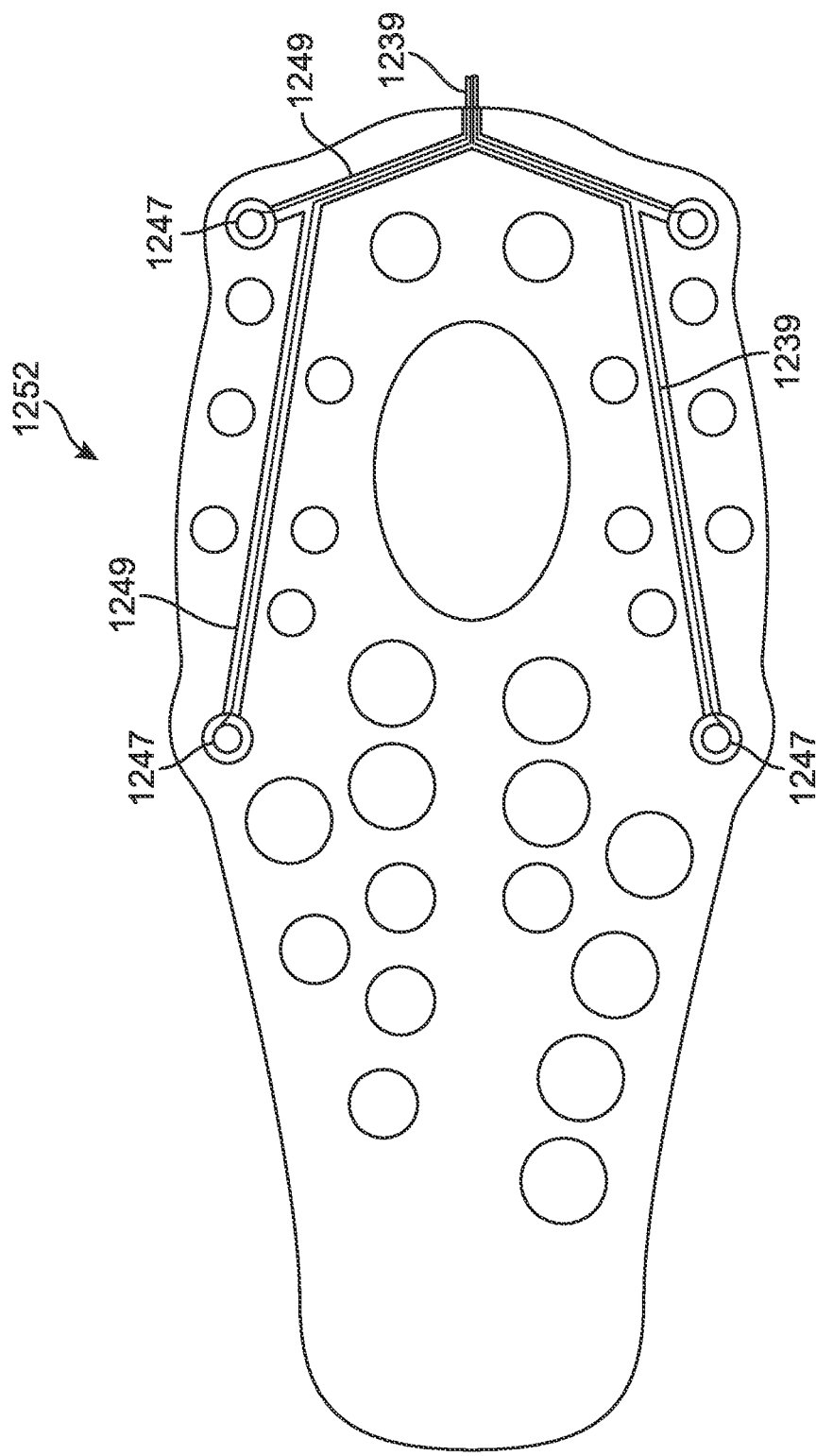
FIG. 33 is a top view of the top plate of the elevated plate structure of FIGS. 28-31 as viewed from line 33-33 in FIG. 31 including portions of the impact-attenuation adjustment components.

As shown in FIG. 31, axial link 1239 can be attached to a collar 1247 at its end proximate plug 1233. Collar 1247 can be formed from a more rigid polymer or other material than plug 1233 for firmly connecting with axial link 1239 without tearing, and it can be shaped and sized to spread out the axial forces it receives from axial link 1239 sufficiently to avoid tearing the plug. Accordingly, collar 1247 is configured to mate with and make interfering contact with plug 1233 to transfer axial forces from link 1239 to plug 1233. As further shown, axial link 1239 extends from collar 1247 through plug 1233, spring 1237 if used, the interior of hollow container 1285 and the closed end 1284 of the hollow container via a small opening formed therein to enter a guide channel 1249 formed in upper plate 1252. As shown in FIGS. 32 and 33, as an example configuration, guide channels 1249 can be formed in upper plate 1252 as open channels in its upper surface. Guide channels 1249 can guide axial link 1239 along a path from the respective hollow container 1285 to control device 1231 in a tensile arrangement that doesn't interfere with wearing the article of footwear and will not be felt by the user's foot.

Figure 34:
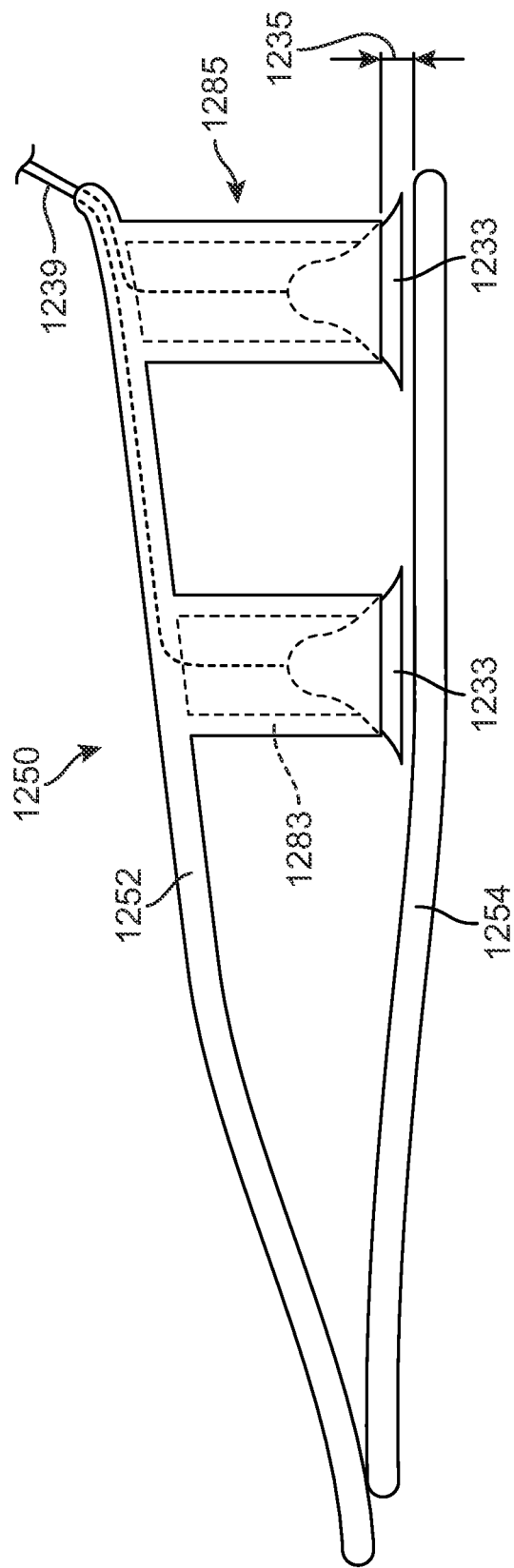
FIG. 34 is a side view of the elevated plate structure of FIGS. 28-30 shown in a partially modified impact-absorption adjustment position.
Figure 35:
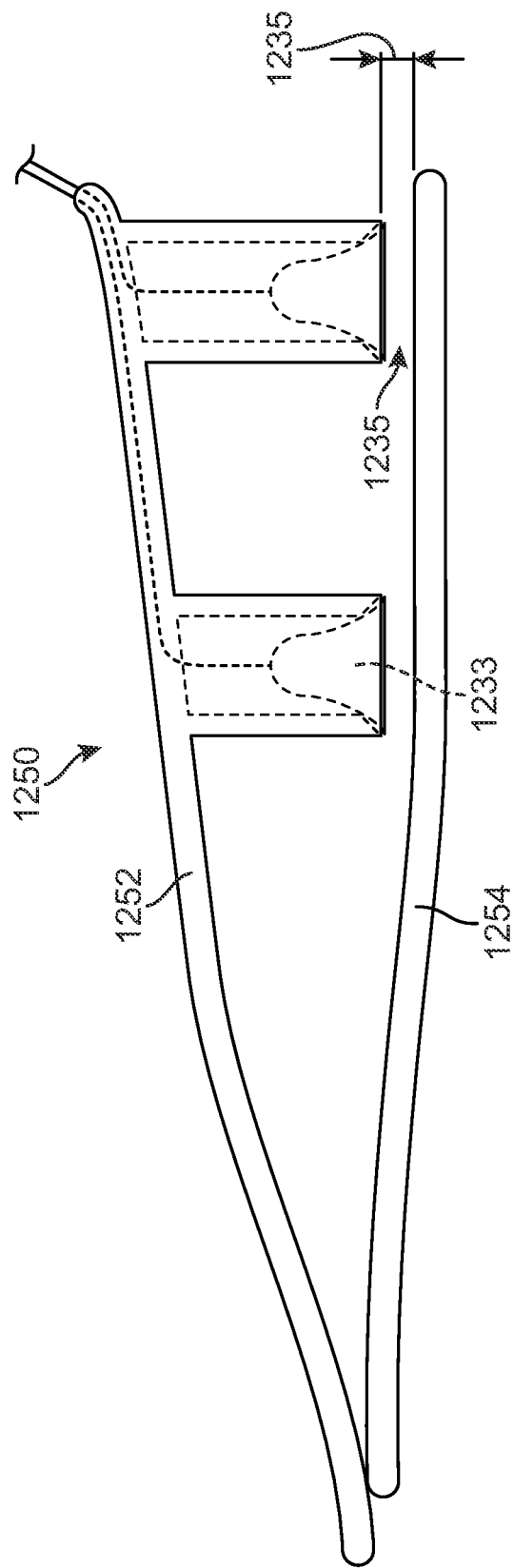
FIG. 35 is a side view of the elevated plate structure of FIGS. 28-30 shown in a fully modified impact-absorption adjustment position.
Figure 36:
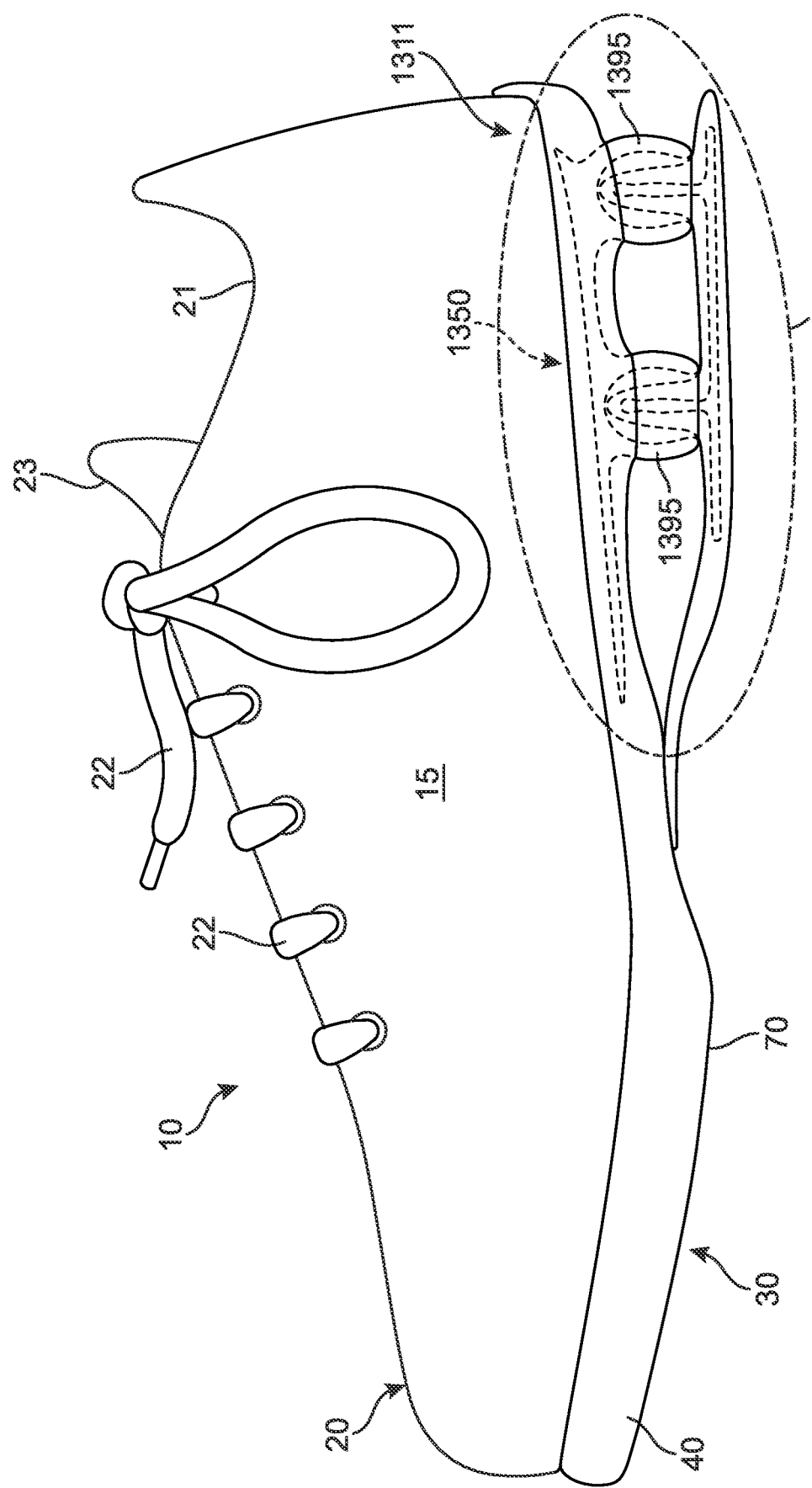
FIG. 36 is a medial side view of an article of footwear including another configuration of an elevated plate structure incorporated within the sole structure in a shock-absorbing arrangement with impact-attenuating members in the heel region.

Referring now to FIGS. 30, 34 and 35, operation of user-adjustable integrated impact-attenuating configuration 1211 is illustrated for example adjustment settings. FIG. 30 can be considered a full impact-attenuation adjustment arrangement in which the user has completely rotated dial 1231 or otherwise entered settings that release axial forces along axial link 1239 a sufficient amount to allow plug 1233 to move according to its bias as far downward as possible until it makes contact with an upper surface of lower plate 1254. In this adjustment arrangement, a large portion of the lower region of plug 1233 extends out of hollow container 1285 and fills the gap formed between the bottom portion of hollow container 1285 and the upper surface of lower plate 1254. Accordingly, downward impacts transmitted from upper plate 1252 through legs 1255 via hollow container sidewalls 1283 act to compress the portion of plug 1233 disposed within gap 1235 against lower plate 1254 and, thus, enable the portion of plug 1233 within the gap to assist with absorbing and attenuating impacts.

It is understood that in such an integrated arrangement, other impact-attenuating mechanisms can exist and cooperate to attenuate impacts, such as impact-attenuating members 1295. Further, significant portions of such impacts may be attenuated by the other impact-attenuating mechanisms, which likely would not be adjustable by the user. However, the other impact-attenuating mechanisms, such as impact-attenuating members 1295, can be configured to attenuate portions of impacts that are baseline amounts of attenuation that should occur under almost any scenario. The integrated arrangement of configuration 1211 can allow for selective user adjustment of impact-attenuation beyond baseline attenuation and within ranges of the types of attenuation that are sensed by the user and generally considered to be comfort-type preferences. In other words, the level of adjustability provided to the user is generally for comfort fine-tuning type adjustments rather than large overall adjustments of the impact-attenuation for the sole structure.

FIG. 34 generally illustrates a midway-type setting by the user between high and low impact-attenuation and FIG. 35 generally illustrates a lowest impact-attenuation setting for the user. In FIG. 34, a fraction of gap 1235 (e.g., about half as shown) is exposed by plug 1233, which has been raised about half its range of motion within hollow container 1285. In such a scenario, downward impacts would initially be attenuated by other impact-attenuating features, such as impact-attenuating members 1295, until upper plate 1252 flexes downward such that a bottom portion of plug 1233 makes contact with lower plate 1254 and the exposed fraction of gap 1235 is closed. At this point, a lower portion of plug 1233 sandwiched between hollow container 1285 and lower plate 1254 can assist with attenuating the impact as it is being compressed.

In FIG. 35, gap 1235 is almost fully exposed by plug 1233, which has been fully raised within its range of movement within hollow container 1285. In such a scenario, downward impacts would be attenuated by other impact-attenuating features for a longer period until upper plate 1252 flexes downward the distance of gap 1235 and the bottom of hollow container 1285 is in contact with lower plate 1254. At this point, the walls 1283 of hollow container 1285 generally act as a column to resist downward impacts.

Referring now to FIGS. 36-39, an additional integrated configuration 1311 is shown of an elevated plate structure 1350 with impact-attenuating member 1395. Integrated configuration 1311 generally includes the same aspects and features of similar integrated configurations, such as configurations 850, 950, 1050 and 1150, except as noted herein. Integrated configuration 1311 includes an elevated plate structure 1350 that provides outer shell regions 1367 for impact-attenuating members, which are curved or bowed outward to act as living hinges while receiving an impact. Further, the lower plate of the elevated plate structure includes upward projections that form support structures that can resist impacts and assist with absorbing them.

Figure 37:
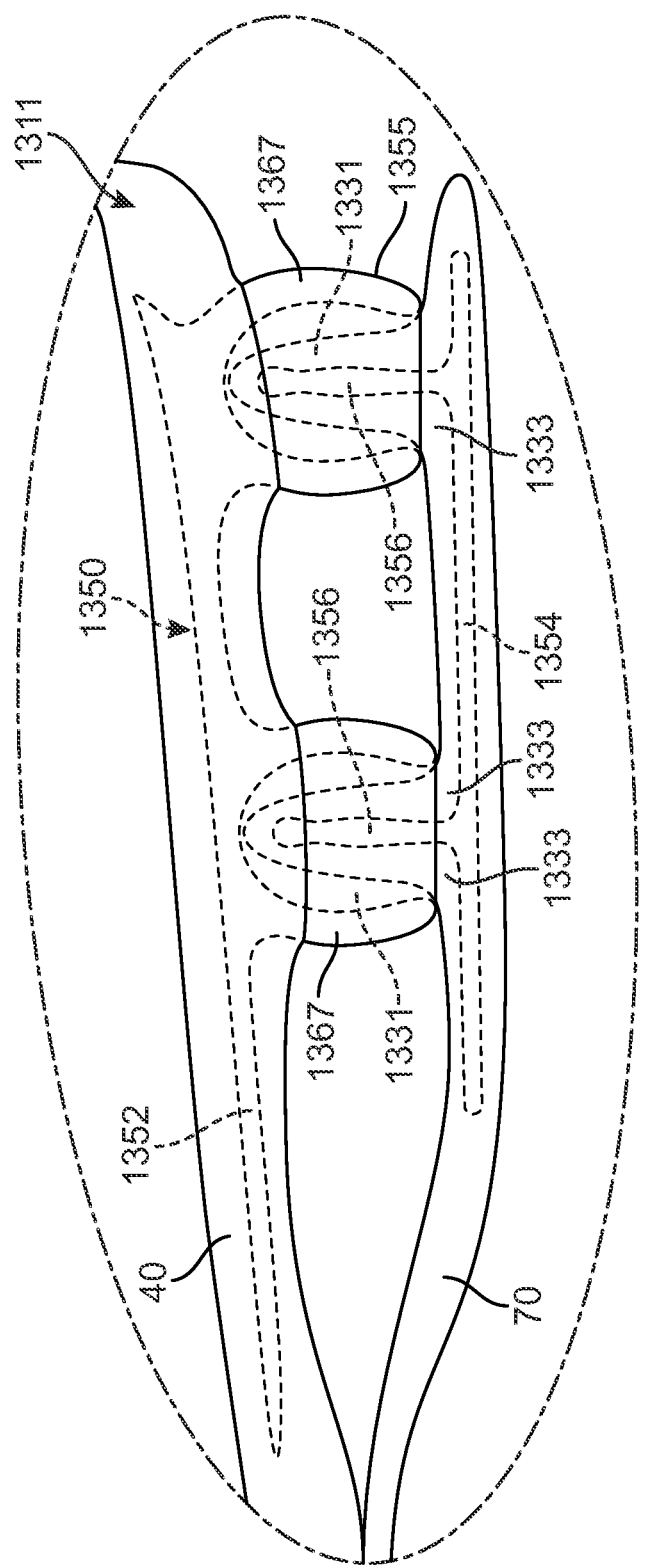
FIG. 37 is a close side view of a portion of the heel region of FIG. 36 showing the elevated plate structure in its shock-absorbing arrangement with impact-attenuating members.
Figure 38:
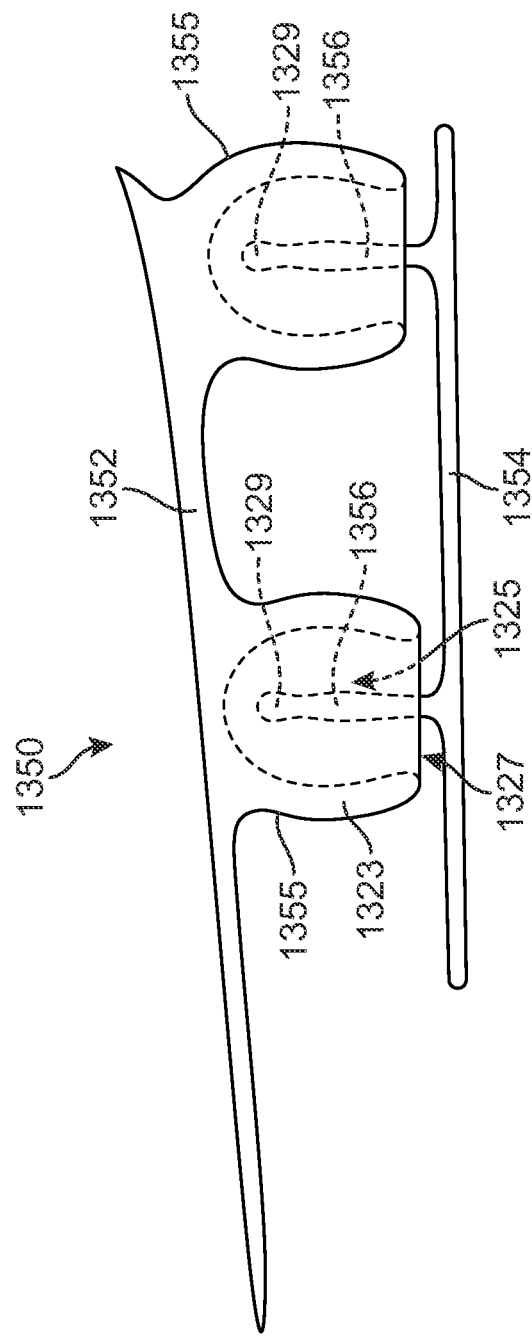
FIG. 38 is a side view of the elevated plate structure of FIGS. 36 and 37 shown with other features in the heel region removed.

Elevated plate structure 1350 generally includes an upper plate 1352, a lower plate 1354, legs 1355 extending downward from the upper plate and forming curved or bowed shells 1321, and posts 1356 extending upward from the lower plate and being received inside the bowed shells. The bowed shells 1321 are formed from curved sidewalls 1323 extending downward from the upper plate in a bulbous cylindrical shape. The curved sidewalls 1323 of each bowed shell also create a hollow interior 1325 for the shell and form an open mouth 1327 at a bottom end of the shell leading into the hollow interior. The outer surface of the curved sidewalls can form the exterior of impact-attenuating members 1395 and can be exposed and visible in the article of footwear. For example, as shown in FIG. 37, upper plate 1352 is embedded in midsole 40 and, thus, covered by material forming the midsole. However, curved sidewalls 1323 extend downward from the midsole and their outer surfaces are viewable as the exterior of columnar impact-attenuating members 1395.

Lower plate 1354 is similarly embedded in material forming outsole 30 and has posts 1356 extending upwardly from its upper surface. However, as shown in FIG. 37, posts 1356 can be covered with resilient material along with the remainder of the lower plate rather than being exposed like the curved sidewalls extending from the upper plate. Covering posts 1356 with a resilient material, such as the foamed polymer used to form the outsole and/or midsole, can provide advantages for attenuating impacts. For instance, it can provide a relatively soft, resilient interface coating 1331 between the comparatively harder non-foamed polymer materials forming curved sidewalls 1323 and the posts 1356. In the configuration shown, upper distal ends of posts 1356 have bulbous caps 1329, which can also improve the interface between the inside of corresponding bowed shells 1321 and the posts extending into the bowed shells.

Each post 1356, its coating 1331 and the corresponding bowed shell 1321 together generally form the impact-attenuating members 1395; although other impact-attenuating members can also be present in the article of footwear. Because the impact-attenuating members are largely created as part of elevated plate structure 1350 or, rather, the members are formed from components of the elevated plate structure, configuration 1350 provides a highly integrated support structure (e.g., the elevated plate structure) for the article of footwear concurrent with providing impact-attenuating members 1395. Further, the integrated support structure and impact-attenuation system provides advantages for attenuating impacts and shocks in downward directions and in other directions, such as angled shocks.

When encountering a downward shock, resilient interface coating 1331 can initially attenuate shocks along with interface portions 1333 of the outsole coating disposed on an upper surface of lower plate 1354 that are engaged by lower distal ends of bowed shells 1321 during downward impacts. As the downward impact continues, posts 1356 and bowed shells 1321 can act as column members and resist displacement. However, for larger impacts, as the downward shock continues to be received, both the posts and bowed shells can buckle and bend to act as living hinges absorbing the shock.

The curved sidewalls of bowed shells 1321 encourage bending to occur in a distributed manner generally along the height of the sidewall, rather than at a discrete location, which provides improved impact attenuation compared with bending at a discrete point. Further, the bulbous cylinder design of the bowed shells causes them to collapse inward while receiving large impacts, which compresses the post 1356 and its coating disposed within the shell in a manner that further attenuates the large impact. In addition, the impact-attenuating features of integrated configuration 1311 perform well when receiving downward angled and even largely lateral impacts. This is due in part to the bulbous cylinder design, as well as the coating interfaces between the corresponding post and bowed shell, which can engage each other, bend, collapse etc. in a similar manner to that described above for downward impacts when receiving impacts in various directions. Accordingly, such a design for an integrated configuration can provide many advantages related to multiple features, such as support, appearance and impact-attenuation for various impacts.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications can be made to the configurations described above without departing from the scope of the present invention, as defined by the appended claims.

What is claimed is:

1. A sole structure for an article of footwear having an upper, the sole structure comprising:
   a midsole;
   a first plate attached to the midsole and including a first surface opposing the midsole and a second surface formed on an opposite side of the first plate than the first surface;
   a leg extending from the second surface to a distal end;
   a second plate spaced apart from the first plate and including a third surface opposing the second surface of the first plate and spaced apart from the distal end of the leg; and
   a resilient member carried and surrounded by the leg at the distal end, the resilient member being spaced apart from the third surface in a first state and being compressed against and between the distal end of the leg and the third surface in a second state.

2. The sole structure of claim 1, wherein the leg includes a cavity at the distal end.

3. The sole structure of claim 2, wherein the resilient member is at least partially received within the cavity.

4. The sole structure of claim 2, wherein the resilient member is operable to selectively translate relative to and within the cavity.

5. The sole structure of claim 4, further comprising a link operable to control movement of the resilient member relative to and within the cavity.

6. The sole structure of claim 1, wherein a degree to which the resilient member extends from the leg is adjustable.

7. The sole structure of claim 1, wherein the resilient member includes an engagement surface extending from the leg and opposing the third surface of the second plate.

8. The sole structure of claim 7, wherein the engagement surface extends between the distal end of the leg and the third surface.

9. The sole structure of claim 7, wherein the engagement surface is disposed between and simultaneously contacts the distal end of the leg and the third surface when the resilient member is in the second state.

10. The sole structure of claim 1, wherein movement of the resilient member into the second state is caused by movement of at least one of the first plate and the second plate toward the other of the first plate and the second plate.

11. A sole structure for an article of footwear having an upper, the sole structure comprising:
    a midsole;
    a first plate attached to the midsole and including a first surface opposing the midsole and a second surface formed on an opposite side of the first plate than the first surface;
    a leg extending from the second surface to a distal end, the leg including a cavity at the distal end;
    a second plate spaced apart from the first plate and including a third surface opposing the second surface of the first plate;
    a resilient member at least partially received within the cavity and operable to selectively translate relative to and within the cavity, the resilient member having (i) a first portion received within the cavity and surrounded by the distal end of the leg and (ii) a second portion protruding from the distal end and disposed between the distal end of the leg and the third surface of the second plate; and
    a link operable to control movement of the resilient member relative to and within the cavity.

12. The sole structure of claim 11, wherein a degree to which the resilient member extends from the leg is adjustable.

13. The sole structure of claim 11, wherein the resilient member is spaced apart from the third surface in a first state and engages the third surface in a second state.

14. The sole structure of claim 13, wherein the resilient member simultaneously contacts the distal end of the leg and the third surface when the resilient member is in the second state.

15. The sole structure of claim 13, wherein movement of the resilient member into the second state is caused by movement of at least one of the first plate and the second plate toward the other of the first plate and the second plate.

16. The sole structure of claim 11, wherein the resilient member includes a distal end that opposes the third surface and is larger than the distal end of the leg.

\* \* \* \* \*